(12) United States Patent
Chen et al.

(10) Patent No.: US 11,445,379 B2
(45) Date of Patent: Sep. 13, 2022

(54) FACILITATING HETEROGENEOUS NETWORK ANALYSIS AND RESOURCE PLANNING FOR ADVANCED NETWORKS

(71) Applicant: AT&T Intellectual Property I, L.P., Atlanta, GA (US)

(72) Inventors: Jie Chen, Watchung, NJ (US); Yuning Yang, Basking Ridge, NJ (US); Zhen Wan, Plano, TX (US); Wenjie Zhao, Princeton, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 4 days.

(21) Appl. No.: 17/037,095

(22) Filed: Sep. 29, 2020

(65) Prior Publication Data
US 2022/0104028 A1 Mar. 31, 2022

(51) Int. Cl.
*H04W 16/18* (2009.01)
*H04W 28/02* (2009.01)

(52) U.S. Cl.
CPC ....... *H04W 16/18* (2013.01); *H04W 28/0247* (2013.01)

(58) Field of Classification Search
CPC . H04W 16/18; H04W 28/0247; H04W 16/00; H04W 16/22; H04B 17/391; H04B 17/3911; H04B 17/3912; H04B 17/3913
See application file for complete search history.

(56) References Cited

U.S. PATENT DOCUMENTS

| 5,404,574 A | * | 4/1995 | Benveniste | ........... | H04W 16/06 |
| | | | | | 455/452.2 |
| 5,668,562 A | * | 9/1997 | Cutrer | ........... | G01R 29/10 |
| | | | | | 343/893 |

(Continued)

FOREIGN PATENT DOCUMENTS

| CN | 105188030 A | * | 12/2015 | ............ | H04W 16/18 |
| DE | 19617440 A1 | * | 11/1997 | ............ | H04W 24/08 |

(Continued)

OTHER PUBLICATIONS

"Mixed Integer Programming" NCSS Statistical Software, Chapter 482. pp. (482-1)-(482-7) 7 pages.

*Primary Examiner* — Mehmood B. Khan
(74) *Attorney, Agent, or Firm* — Amin, Turocy & Watson, LLP

(57) ABSTRACT

Facilitating analysis and resource planning for advanced heterogeneous networks (e.g., 5G, 6G, and beyond) is provided herein. A system is provided that includes a processor and a memory that stores executable instructions that, when executed by the processor, facilitate performance of operations. The operations can include determining that a resource is to be added to existing resources at a grid level of a heterogeneous network. Further, the operations can include selecting candidate locations for placement of the resource based on a coverage-driven objective and a capacity-driven objective defined for the heterogeneous network. The coverage-driven objective can be associated with a demand for services within the grid level of the heterogeneous network.

(Continued)

The capacity-driven objective can be associated with demand growth within the grid level of the heterogeneous network. The resource can be a fifth generation millimeter wave node or a cloud radio access network node.

20 Claims, 12 Drawing Sheets

(56) References Cited

U.S. PATENT DOCUMENTS

| | | | | |
|---|---|---|---|---|
| 8,229,442 B1* | 7/2012 | Ji | H04W 24/00 | 455/446 |
| 9,516,512 B2* | 12/2016 | Yi | H04W 72/042 | |
| 10,652,699 B1* | 5/2020 | Poer | H04B 17/318 | |
| 11,109,244 B2* | 8/2021 | Rengarajan | H04W 24/02 | |
| 2005/0153704 A1* | 7/2005 | Luss | H04W 16/18 | 455/452.1 |
| 2008/0045234 A1* | 2/2008 | Reed | H04B 17/318 | 455/456.1 |
| 2010/0284303 A1* | 11/2010 | Catovic | H04W 24/02 | 370/254 |
| 2011/0090981 A1* | 4/2011 | Lindgren | H04B 7/0689 | 375/267 |
| 2013/0252620 A1* | 9/2013 | Kobayashi | H04W 16/18 | 455/446 |
| 2014/0029521 A1* | 1/2014 | Puthenpura | H04W 16/10 | 370/329 |
| 2014/0031049 A1* | 1/2014 | Sundaresan | H04W 24/02 | 455/446 |
| 2014/0243012 A1* | 8/2014 | Wirola | G01S 5/0236 | 455/456.1 |
| 2017/0311362 A1* | 10/2017 | Hong | H04W 16/10 | |
| 2019/0268780 A1* | 8/2019 | Sarkar | H04B 17/336 | |
| 2020/0162941 A1* | 5/2020 | Bapat | H04W 24/02 | |
| 2020/0178085 A1* | 6/2020 | Ertimo | H04W 16/18 | |
| 2021/0136656 A1* | 5/2021 | Koutsaftis | H04L 1/1896 | |
| 2021/0150096 A1* | 5/2021 | Priest | G06V 20/176 | |

FOREIGN PATENT DOCUMENTS

| | | | | |
|---|---|---|---|---|
| EP | 1175115 A2 * | 1/2002 | | H04W 16/18 |
| WO | WO-2011050721 A * | 5/2011 | | H04W 16/18 |
| WO | WO-2019158210 A1 * | 8/2019 | | G01S 5/0252 |
| WO | WO-2019159965 A1 * | 8/2019 | | G01S 5/02521 |
| WO | WO-2021012829 A1 * | 1/2021 | | |

* cited by examiner

FACILITATING HETEROGENEOUS NETWORK ANALYSIS AND RESOURCE PLANNING FOR ADVANCED NETWORKS

TECHNICAL FIELD

This disclosure relates generally to intelligent placement of resources in Fifth Generation (5G), Sixth Generation (6G), or other advanced networks and, more specifically, to management of resources in a heterogeneous network.

BACKGROUND

The use of computing devices is ubiquitous. Given the explosive demand placed upon mobility networks and the advent of advanced use cases (e.g., streaming, gaming, and so on), radio access network capacity and/or coverage needs should be addressed, such as through the placement of new resources (e.g., nodes) within the network. How to plan and place such nodes optimally in large scale networks is a challenging problem in view of limited resources and costs, rising demands, and interference among cells. Accordingly, unique challenges exist related to analysis and placement of such resources and in view of forthcoming 5G, 6G, or other next generation, standards for wireless communication.

BRIEF DESCRIPTION OF THE DRAWINGS

Various non-limiting embodiments are further described with reference to the accompanying drawings in which.

DETAILED DESCRIPTION

Figure 1:
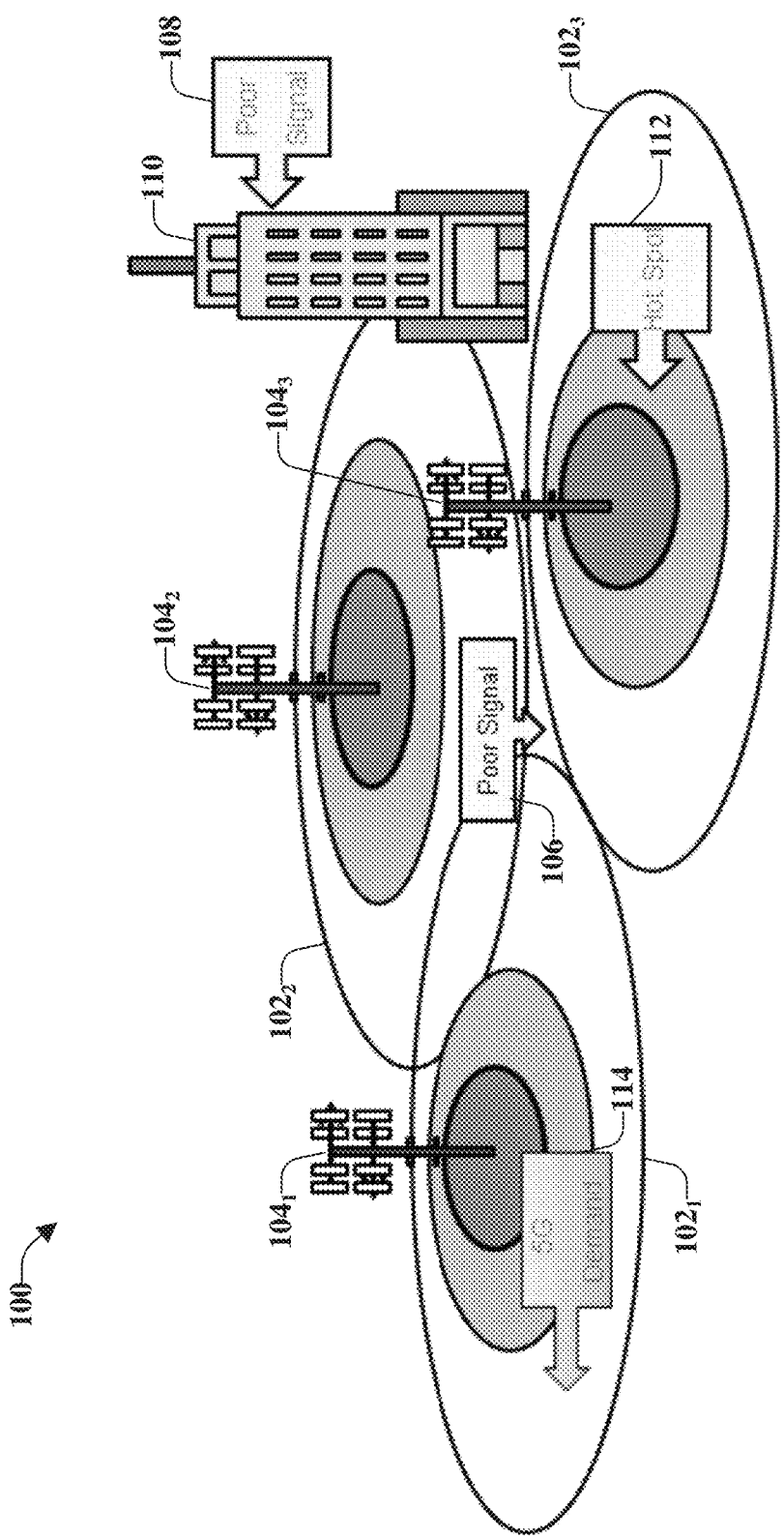
FIG. 1 illustrates an example, non-limiting, representation of a heterogeneous network in accordance with one or more embodiments described herein.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular network, networked environment or standard).

Described herein are apparatuses, systems, methods, articles of manufacture, and other embodiments that can facilitate location selection and implementation of placement of resources in a heterogeneous network to address coverage, capacity, or both coverage and capacity objectives associated with the heterogeneous network. As discussed herein, a heterogeneous network (HetNet) is a communications network in which a combination of macrocells, microcells, picocells, femtocells, and so on, is utilized to provide wireless coverage to communication devices or computing devices, also referred to as User Equipment (UE) within the service area or coverage area of the network. Further, a HetNet can facilitate complex interoperation and communication between macrocells, small cells, WiFi network elements, and so on, to provide handoff (or handover) capability among such network elements.

Given the explosive demand in mobility network and the advent of many Fifth Generation (5G) and/or Sixth Generation (6G) use cases, cRAN (Cloud or Centralized Radio Access Network) and 5G mmWave (Fifth Generation millimeter Wave) can be solutions to address RAN (Radio Access Network) capacity and/or coverage needs and new 5G and/or 6G use cases. The number of cRAN and/or 5G mmWave nodes needed can scale massively over the next few years. How to plan and place those nodes optimally on a large scale is a challenging problem considering limited resources, rising demands, and interference among cells. Conventional design methodologies are time consuming and are manual-labor intensive. Further, heuristic algorithms are usually sub-optimal to plan and place the nodes on a market basis (e.g., throughout a market coverage area).

The embodiments described herein can utilize a mixed integer programming (MIP) model to consider different constraints or parameters (e.g., resources, demand, interference, and so on), singularly or in combination, to determine an optimal (or the best available) solution for placement of resources. This process is automated and can be easily deployed nation-wide, or on a smaller scale. The disclosed embodiments provide a cRAN and 5G mmWave design template that can be utilized for construction and deployment of the resources and/or the network. In some optional embodiments, Radio Frequency (RF) engineers or other personnel can utilize the cRAN and 5G mmWave design template and can make further fine tuning before the construction and deployment of the resources in the network. However, such additional manual configuration is not utilized in some implementations.

According to an embodiment is a method that can include determining, by a system comprising a memory and a processor, candidate locations for placement of a resource within a defined grid area associated with a communication network based on a determination that a demand for services within the defined grid area exceeds a coverage capability of the defined grid area. The method also can include facilitating, by the system, the placement of the resource within the defined grid area. The placement of the resource can be determined to satisfy a demand for services, which can be a current level of demand, or an expected level of demand. Further, the placement of the resource can be based on the candidate locations.

In an example, determining the placement of the resource can include receiving, by the system, one or more conditions identified for the defined grid area. Further, determining the placement can include transforming, by the system, the one or more conditions into input data for a mixed integer programming model, wherein the input data includes at least one constraint of the mixed integer programming model and at least one objective of the mixed integer programming model.

Further to the above example, the resource can be a cloud radio access network node and facilitating the placement can include retaining a traffic load weighted coverage score of the defined grid area below a threshold load weighted coverage score level. Alternatively, or additionally, the resource can be a fifth generation millimeter wave node that communicates according to a fifth generation millimeter wave protocol and selecting the placement can retain a fifth generation traffic load weighted coverage score of the defined grid area below a threshold load weighted coverage score level.

According to some implementations, determining the placement of the resource includes determining a load weighted coverage score of the defined grid area based on the placement of the resource. Further, determining the placement can include selecting the placement of the resource based on the load weighted coverage score satisfying a predefined threshold.

Further to the above implementations, the resource can be a cloud radio access network node, and the load weighted coverage score can be selected to retain a quantity of cloud radio access network nodes located in the defined grid area below a defined quantity. Alternatively, or additionally, the resource can be a fifth generation millimeter wave node that communicates according to a fifth generation millimeter wave protocol, and the load weighted coverage score can be selected to restrict a quantity of fifth generation millimeter wave nodes in the defined grid area below a defined quantity.

In some implementations, determining the placement of the resource can include using, by the system, a mixed integer programming model built to solve resource placement issues in a communications network. The mixed integer programming model can consider short term planning and long term planning for the defined grid area.

In some implementations, the method can include rendering, by the system, an indication of the candidate locations for placement of the resource within the defined grid area on a display area of a user equipment. According to some implementations, the method can include, prior to determining the placement of the resource, determining, by the system, that a number of dropped communications within the defined grid area exceeds a defined dropped communication level.

Another embodiment provided herein relates to a method that can include determining, by a system comprising a memory and a processor, candidate locations for positioning a resource within a grid area associated with a communications network based on a determination that demand for services exceeds a current capability of the communications network within the grid area. Further, the method can include facilitating, by the system, the positioning of the resource within the grid area based on the candidate locations. Positioning of the resource can include offloading network traffic from an existing resource to the resource that has been positioning in the grid area.

In some implementations, the communications network is a heterogeneous network, and the existing resource is a macrocell. Further to these implementations, facilitating the positioning can include offloading network traffic from the macrocell to a cloud radio access network node associated with the communications network. In an example, the offloading can include avoiding a carrier split within the communications network. In another example, the offloading can include maintaining a number of carriers for the communications network.

According to some implementations, the communications network is a heterogeneous network, the existing resources are macrocells, and the demand for services is classified as fifth generation services. Further to these implementations, facilitating the positioning can include offloading network traffic from the macrocells to a fifth generation millimeter wave node.

In some implementations, prior to facilitating the positioning, the method can include evaluating, by the system, a value associated with the positioning. Facilitating the positioning can be performed based on the value satisfying a function with respect to a defined value.

Another embodiment provided herein relates to a system that can include a processor and a memory that stores executable instructions that, when executed by the processor, facilitate performance of operations. The operations can include determining that a resource is to be added to existing resources at a grid level of a heterogeneous network. Further, the operations can include selecting candidate locations for placement of the resource based on a coverage-driven objective and a capacity-driven objective defined for the heterogeneous network. The coverage-driven objective can be associated with a demand for services within the grid level of the heterogeneous network. The capacity-driven objective can be associated with demand growth within the grid level of the heterogeneous network. The resource can be a fifth generation millimeter wave node or a cloud radio access network node.

In some implementations, selecting the placement can include determining a solution to the coverage-driven objective and the capacity-driven objective based on mixed integer programming and a design configuration defined for the heterogeneous network. Further, selecting the placement can include applying a programming approach to determine the placement of the resource.

FIG. 1 illustrates a representation of an example, non-limiting, heterogeneous network 100 in accordance with one or more embodiments described herein. The heterogeneous network 100 is a network that includes together small cells, macrocells, other network elements, and/or other network equipment. The heterogeneous network 100 can include various coverage areas (or geographic areas), illustrated as a first coverage area $102_1$, a second coverage area $102_2$, and a third coverage area $102_3$. The first coverage area $102_1$ is serviced by first network equipment $104_1$, the second coverage area $102_2$ is serviced by second network equipment $104_2$, and the third coverage area $102_3$ is serviced by third network equipment $104_3$. Although illustrated in this example as base stations, the first network equipment $104_1$, the second network equipment $104_2$, and/or the third network equipment $104_3$ can be another type of network equipment.

The embodiments discussed herein relate to targeting the placement of small cells in order to satisfy capacity and/or coverage needs of the wireless network (e.g., the heterogeneous network 100) both currently and in the future. The heterogeneous network 100 can be a 5G network, a 6G network, or another advanced network. A consideration of the various embodiments is how the resources or nodes (e.g., the new nodes) should be placed in the network optimally and with scalability so that different needs of the network can be satisfied. The disclosed embodiments can solve an optimization problem to include various constraints and targets on a configuration, and then use a mixed linear programming model to solve the problem holistically so that there is an optimal solution related to where to place new nodes in an heterogenous network.

Some areas of the heterogeneous network 100 can experience coverage issues, such as, but not limited to, poor signals. For example, two such areas are indicated, namely a first poor signal 106, which represents a coverage hole or coverage gap, and a second poor signal 108, which represents poor signal in a structure 110, such as a building or another type of signal obstruction. Another area of poor signal can be at an edge of the cell (not shown).

Further, the heterogeneous network 100 can have capacity issues. For example, one or more areas of the heterogeneous network 100 can be a hot spot, which represents an area that is experiencing an increased amount of usage as compared to other areas. One such area is represented by hot spot 112. In this example, there can be a large amount of traffic (or an expectation of a large amount of traffic) and the macrocell, which is already placed there, does not have enough capability to handle the large amount of traffic or handling of the large amount of traffic uses a large amount (or nearly all) of the capability of the macrocell. The expectation (or prediction) of the large amount of traffic can be, for example, an event center or sports center that periodically (or based on another interval, for example, weekly, daily, and so on) hosts events, an area with high growth (e.g., a housing development, a retail development, an urban area and so on). In another example, the area can unexpectedly have a high demand for services, such as during an emergency situation, during an informal gathering, during a demonstration, during a protest, and/or during other events. Since the macrocell might not have, or might not be expected to have, enough capacity to handle the increased demand, a small cell (or more than one small cell) can be strategically placed to offload a certain amount of the traffic from the macrocell. Thus, the macrocell will be less heavily loaded and can potentially serve a larger area (in conjunction with the small cells). Further, although the small cell has offloaded some of the traffic from the macrocell, the small cell can still service at least a portion the local area and, thus, the overall network capacity can be improved.

Further, one or more areas can have a 5G demand, such as the area represented by 5G demand 114. Accordingly, based on the 5G demand, one or more 5G nodes and/or other network equipment can be strategically placed to support the corresponding need. Further, it is noted that there might not be just one area or location that has a need. Accordingly, the disclosed aspects can design location placement in order to solve as many issues as possible while minimizing the number of nodes placed in the network, in order to minimize costs and/or other considerations. Thus, overall network capacity and throughput can be improved while minimizing backhaul costs and/or fronthaul costs. Thus, if a location of a small cell, for example, can satisfy both capacity and carrier needs, the placement of the small cell can be selected for good backhaul support. These considerations can be configured in a model (e.g., an optimization model, a mixed integer programming model) and determined by the model in order to provide a solution to the placement problem.

It is noted that although one or more particular areas are indicated as areas having a poor signal, being a hot spot, or having 5G demand, the disclosed aspects are not limited to these coverage issues and/or areas of a network. In some cases, more than two areas of poor signal, more than one hot spot area, and more than one area of 5G demand can be included in a network. Further one or more areas, or portions thereof, can have a poor signal, be a hot spot, have a 5G demand, and/or other needs.

An objective of the various embodiments discussed herein can be to maximize usage of heterogeneous network coverage and capacity in a holistic approach. For example, the disclosed embodiments can be utilized to address coverage holes to improve signal quality. In another example, the disclosed embodiments can off-load macrocells to avoid spectrum exhaust and enhance network performance. Further the disclosed embodiments can provide 5G capability to support corresponding use cases. In another example, the disclosed embodiments can improve the overall network capacity and throughput. In further examples, the disclosed embodiments can reduce and/or minimize backhaul costs and/or fronthaul costs.

Some areas could have both issues (e.g., capacity and coverage issues). In some cases, there might be high demand, however, since there is poor coverage, the high demand cannot be detected. In these cases, a coverage driven approach can be utilized and, at about substantially the same time or later, it can be determined that a capacity driven approach should also be applied, or vice versa. However, in some implementations, the coverage and capacity issues can be solved at substantially the same time.

Figure 2:
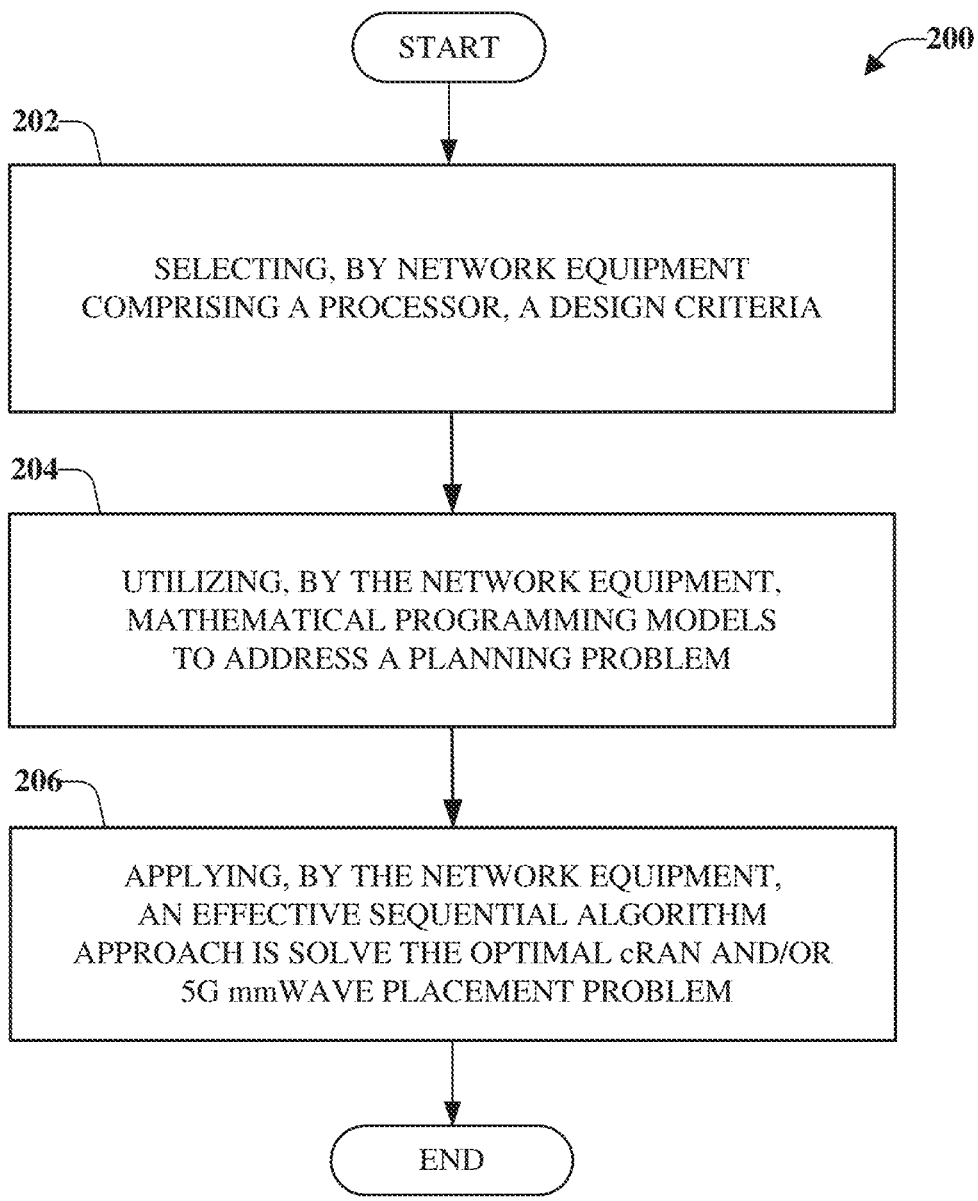
FIG. 2 illustrates a flow diagram of an example, non-limiting, computer-implemented method for facilitating heterogeneous resource analysis and planning in advanced networks in accordance with one or more embodiments described herein.

FIG. 2 illustrates a flow diagram of an example, non-limiting, computer-implemented method 200 for facilitating heterogeneous resource analysis and planning in advanced networks in accordance with one or more embodiments described herein. Repetitive description of like elements employed in other embodiments described herein is omitted for sake of brevity.

In some implementations, a system comprising a processor can perform the computer-implemented method 200 and/or other methods discussed herein. In other implementations, a device comprising a processor can perform the computer-implemented method 200 and/or other methods discussed herein. In other implementations, a non-transitory machine-readable medium can include executable instructions that, when executed by a processor, facilitate performance of operations, which can be the operations discussed with respect to the computer-implemented method 200 and/or other methods discussed herein. In further implementations, a machine readable or computer readable storage device comprising executable instructions that, in response to execution, cause a system comprising a processor to perform operations, which can be operations discussed with respect to the computer-implemented method 200 and/or other methods discussed herein. Further, in some implementations, various equipment (e.g., network equipment, user equipment) comprising at least one processor can perform the computer-implemented method 200 and/or other methods discussed herein.

The computer-implemented method 200 starts at 202 when a design criteria for a network is selected. The network can be a heterogeneous network; however, the disclosed embodiments are not limited to a heterogeneous network and can be applied to a homogeneous network (which becomes a heterogenous network with the placement of small cells as discussed herein). The design criteria can include, for example, coverage, capacity, or both coverage and capacity. For a coverage design criteria (e.g., coverage driven), the target area can be an area with poor coverage and high potential demand for which it is desired to improve customer retention (e.g., users) and attract new users (via their associated UEs). For a capacity design criteria (e.g., capacity driven), a goal can be to maximize the heterogeneous capacity to offload network traffic from macrocells and satisfy demand growth (e.g., expected demand in the future) while minimizing cRAN and/or 5G mmWave network cost by considering RF capacity and transport costs simultaneously or at about the same time or substantially the same time. Transport costs can include backhaul costs and/or fronthaul costs.

At 204 of the computer-implemented method 200, mathematical programming models can be used to address a planning problem. For example, the planning problem can be a cRAN and/or 5G mmWave planning problem. In another example, the mathematical programming models can be used to solve for an optimal solution via a mixed integer programming model based on the design criteria selected at 202.

In an example, for the coverage objective, sample objectives (e.g., variable parameters) can include, but are not limited to, improvement in network performance and/or population control. The network performance can include, for example, a Network Performance Score (NPS), which is a single metric that characterizes the overall network performance based on the perspective of end users or on other factors. The perspective of the end users can be inferred based on various conditions at the user equipment (e.g., dropped call rate, network traffic congestion, and so on). In another example, the perspective can be based on input received from one or more end users and/or associated user equipment. Another network performance can include one or more Key Performance Indicators (KPIs), which can indicate whether performance goals are, or are not, being satisfied.

For the capacity objective, sample objectives (e.g., variable parameters) can include, but are not limited to, saving target capacity over competing capacity options. The capacity options can include, for example, macro carrier adds, cell splits, and so on. In another example, constraints can include, but are not limited to, desired coverage performance level, RF quality performance level, and cRAN capacity, and/or 5G mmWave capacity. The RF quality performance level can include server dominance, Signal to Interference Noise Ratio (SINR), and so on.

The computer-implemented method 200 continues, at 206, when an effective sequential algorithm approach (dynamic programming) is applied to solve the optimal cRAN and/or 5G mmWave placement problem. The placement problem can be solved using a mixed integer programming model (e.g., an optimizer). If the placement problem cannot be solved effectively (e.g., too many variables, too many constraints, and so on), sequential algorithm and/or dynamic programming can be utilized as an alternative to reduce the computation efforts. Therefore, dynamic programming is proposed to deal with the long term planning case (multiple time periods), which usually has many variables. For example, planning should be performed for each defined time period (e.g., monthly, quarterly, semi-annually, annually, and so on) placement problem for several years. The placement in the current period (e.g., a set point in time or a defined future time) will have an impact on the placement in next and future periods. To build multiple time period problems all together as a single mixed integer programming problem might be too complicated. Hence, the programming problem can be solved for each time period using sequential algorithm programming and/or dynamic programming.

Optionally, after the sequential algorithm approach or dynamic programming is applied, a software tool can be implemented to enable the cRAN and/or 5G mmWave planning via a user friendly interface with interactive graphical display. For example, the software tool can include HetNet Analysis and Resource Planning (HARP). The user friendly interface can be associated with respective UEs that are located remote from the various systems, methods, and other embodiments discussed herein (e.g., communication can be via a cloud computing network or another computing network).

Planning and placement of cRAN and/or 5G mmWave should take into consideration one or more factors. Such factors can include, but are not limited to, different indoor and outdoor requirements, overall heterogeneous network coverage and capacity, cost of transport, cost of attachment structures, heterogeneous network design criteria, and/or net financial saving over competing capacity options. The competing capacity options can include macrocell carrier add, cell splits, and new site builds.

Traditionally, cRAN and/or 5G mmWave nodes are placed based on marketing and customer feedback. Multiple scores are defined for target design areas according to collected network information (e.g., traffic load, signal strength, KPI, Net Promoter Score (NPS), and so on). Thereafter, empirical weights are applied to the defined scores and rank order of potential cRAN/5G mmWave sites subject to a budget constraint. A third traditional design tool that typically uses heuristic algorithms is used and provides sub-optimal solutions. Such a traditional method uses significant manual efforts. Moreover, the traditional solution is based on localized heuristic approaches without considering an entire market holistically. The resulting traditional design is sub-optimal.

Figure 3:
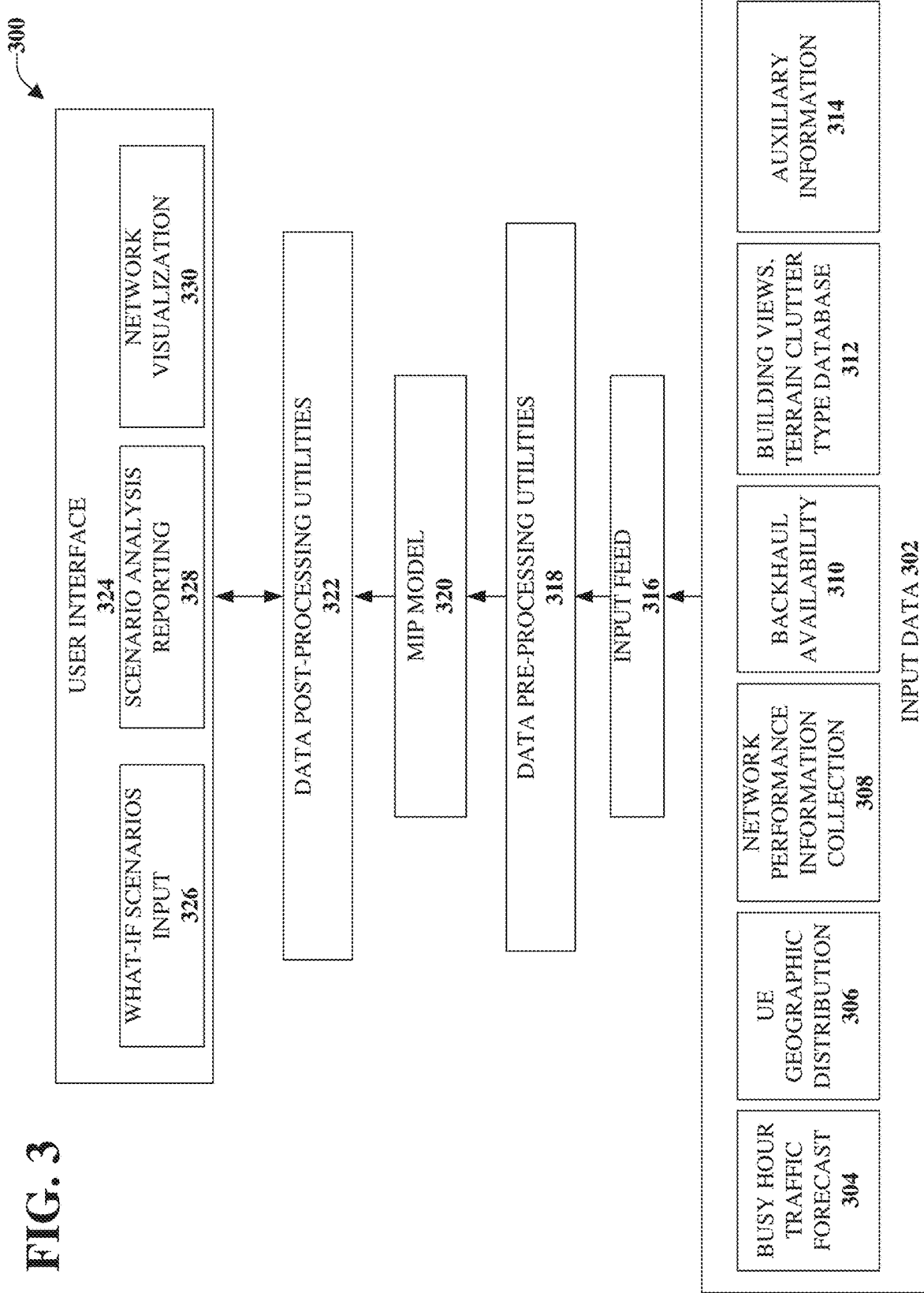
FIG. 3 illustrates an example, non-limiting, high level architecture of an apparatus in accordance with one or more embodiments described herein.

FIG. 3 illustrates an example, non-limiting, high level architecture of an apparatus 300 in accordance with one or more embodiments described herein. As discussed with respect to FIG. 2, different areas of a network (e.g., the heterogeneous network 100, a homogeneous network) can have different needs. For example, there could be a coverage issue in one area and a capacity issue in a different area. In another example, an area could have both coverage issues and capacity issues.

Input to the apparatus 300 can include various forms of data collection, referred to as input data 302. For example, as illustrated, the input data 302 can include a first set of information 304 related to busy hour traffic forecast. A second set of information 306 can include User Equipment (UE) geographic distribution (e.g., information indicative of where the UEs are within the network). A third set of information 308 can include network performance information collection, which can be information related to the existing network (e.g., a current configuration before the placement of new resources). A fourth set of information 310 can include backhaul availability data, which relates to potential locations where a new or additional resource can be placed. In some implementations, the fourth set of information 310 can additionally, or optionally, include fronthaul availability data. A fifth set of information 312 can include building views, terrain clutter type database. For example, a location (e.g., a grid or bin into which the location is divided) can be different depending on whether the location is an outdoor location or an indoor location. For example, in an indoor location, walls or other obstructions might allow resources to be placed closer together (e.g., a first resource can be on a first side (e.g., in a first room) of the wall and a second resource can be on the other side of the wall (e.g., in a second room)), which might not be the case for an outdoor location. In another example, an outdoor area may cover a larger area while an indoor area might be limited to the same floor only, or has different noise considerations based on the existence or walls of other structures. Other input data include a sixth set of information 314, which can be auxiliary information (e.g., carrier add cost, cell split cost, and so on). Further, other information that can be utilized to determine placement of additional resources can be included as input data 302, although not illustrated or specifically described.

The collected information (e.g., the input data) is gathered as an input feed 316. The input feed 316 is provided to one or more data pre-processing utilities 318, which convert the information (e.g., the input data 302, the input feed 316) into parameters that can be utilized by an MIP model 320. Thus, the input data can be converted or transformed into constraints and objective of the MIP model 320.

As discussed, a coverage driven approach can be utilized to plan placement of cells (e.g., resources, nodes) to improve the coverage of an area in order to improve a customer experience. A capacity driven approach can be utilized for handling demand growth. For example, there might currently be a tight capacity that is not expected to meet the new demand. In some cases, both a coverage driven approach and a capacity driven approach can be addressed at substantially a same time, or in close temporal proximity to one another. Accordingly, small cells can be added to maximize the overall capacity so that network traffic can be offloaded from the macrocell. For example, the macrocell can have 1500 users and 200 of those users can be offloaded to small cells such that the macrocell can maintain good throughput. In the future, the growth might be predicted to be 2000 users and, since network traffic has been offloaded to one or more small cells, the macrocell (in conjunction with the small cells) will be able to handle the additional traffic.

At substantially the same time, it can be desired to minimize other costs, such as transportation costs in the backhaul and/or fronthaul when the location is considered. When small cells are placed, there is fiber, for example, that is needed in the backhaul (and/or fronthaul) so, therefore, small cells cannot be placed everywhere. Also, costs are different in different locations, so the cost information can also be added into the configuration (e.g., input as input data 302 into the MIP model 320).

Therefore, based on the above as well as other considerations, an ultimate solution (e.g., one or more candidate locations or a candidate pool) can be determined with the use of mixed integer programming (e.g., via the MIP model 320). There can be a coverage objective which indicates that the coverage will improve the overall network performance. For example, there can be KPIs or other indicators that reflect how good the signal is and the KPI or other indicators can be converted (e.g., transformed) into a customer retention score(s) and/or a customer satisfaction score(s). Another example objective can be to maximize the population of users (e.g., UEs) that experience a good signal.

The capacity objective can be, for example, saving a packet over competing capacity. For example, what is the least number of macrocell carriers that have to be added to support the rising demand. In another example, an objective can be to introduce new small cells into the network in order to conserve capital or investment by postponing or delaying when a new microcell carrier and/or macro carrier needs to be deployed in the network (e.g., a return on investment consideration).

In another example, a constraint can be to have a lower bound of coverage performance (e.g., a threshold). For example, there should be at least 95% (or another percentage) of area in this market covered. An area might have a defined RF quality performance level and it can be determined whether the area is covered by good cells (e.g., an appropriate number of cells) and good capacity (e.g., an appropriate capacity level). Also, once a small cell (e.g., cRAN or 5G mmWave) is placed, such small cell has capacity limits because it is a small cell. Thus, the limits of the small cells can be utilized as inputs to the model (e.g., the MIP model 320) so that the capacity offloaded from the macrocell does not exceed the capacity limit of the small cell. One or more of these can be inputs (input data 302, input feed 316) to the model (e.g., the MIP model 320) via the data pre-processing utilities 318.

With continuing reference to FIG. 3, the MIP model 320 uses the parameters to select one or more locations for one or more resources. The MIP model 320 can output the one or more locations, or more specifically, respective indications (or information indicative) of the one or more locations to one or more data post-processing utilities 322.

The one or more data post-processing utilities 322 can convert or transform the information from the MIP model 320 into one or more variables that indicates the real solution (e.g., the candidate location(s)). The respective indications (or the one or more variables) can include, but are not limited to, coordinate information that includes latitude, longitude and elevation information, Three-Dimensional (3D) Cartesian coordinates, geographic coordinate system information, Global Positioning System (GPS) information, a pointer or other marker on an electronic map that points to (or in indicative of) the location, and so on.

According to some implementations, the one or more variables determined by the one or more data post-processing utilities 322 can be provided to at least one user interface 324. For example, the at least one user interface 324 can be associated with at least one user equipment, which can be located remote from the apparatus 300 (e.g., accessed via a cloud computing network). The at least one user interface 324 can be utilized to output the information related to the placement (e.g., a candidate location) of the at least one resource in order to determine costs to place the at least one resource in the system, the RF condition, and so on. As illustrated, the at least one user interface 324 can facilitate the determination of "what-if scenarios input" 326 (e.g., if we place a resource in a certain location, what impact will it have on other resources and/or the network as a whole).

Further, scenario analysis reporting 328 can be facilitated through utilization of the at least one user interface 324. The associated reports can be output on the user interface, output via a microphone, and/or printed in a tangible format (e.g., on paper). Further network visualization 330 can be provided via the at least one user interface 324 in order to analyze the entire network.

According to some implementations, the at least one user interface 324 (as well as other interface components discussed herein) can provide a Graphical User Interface (GUI), a command line interface, a speech interface, Natural Language text interface, and the like. For example, a GUI can be rendered that provides an entity (e.g., a user) with a region or means to load, import, select, read, and so forth, various requests and can include a region to present the results of the various requests and/or the output of models that facilitate the placement of resources in a heterogeneous network as discussed herein. The models can include models associated with coverage driven approaches and/or capacity driven approaches for selection and placement of additional resources in the heterogeneous network (or a portion thereof (e.g., bin, grid, and so on)).

The regions of the GUI can include known text and/or graphic regions that include dialogue boxes, static controls, drop-down-menus, list boxes, pop-up menus, as edit controls, combo boxes, radio buttons, check boxes, push buttons, graphic boxes, and so on. In addition, utilities to facilitate the information conveyance, such as vertical and/or horizontal scroll bars for navigation and toolbar buttons to determine whether a region will be viewable, can be employed. Thus, it might be inferred that the entity did want the action performed. As utilized herein an entity can be one or more computers, the Internet, one or more systems, one or more commercial enterprises, one or more computers, one or more computer programs, one or more machines, machinery, one or more users, one or more customers, one or more humans, and so forth, hereinafter referred to as an entity or entities depending on the context.

The entity can also interact with the regions to select and provide information through various devices such as a mouse, a roller ball, a keypad, a keyboard, a pen, gestures captured with a camera, a touch screen, and/or voice activation, for example. According to an aspect, a mechanism, such as a push button or the enter key on the keyboard, can be employed subsequent to entering the information in order to initiate information conveyance. However, it is to be appreciated that the disclosed aspects are not so limited. For example, merely highlighting a check box can initiate information conveyance. In another example, a command line interface can be employed. For example, the command line interface can prompt the entity for information by providing a text message, producing an audio tone, or the like. The entity can then provide suitable information, such as alpha-numeric input corresponding to an option provided in the interface prompt or an answer to a question posed in the prompt. It is to be appreciated that the command line interface can be employed in connection with a GUI and/or Application Program Interface (API). In addition, the command line interface can be employed in connection with hardware (e.g., video cards) and/or displays (e.g., black and white, and Video Graphics Array (VGA)) with limited graphic support, and/or low bandwidth communication channels.

Figure 4:
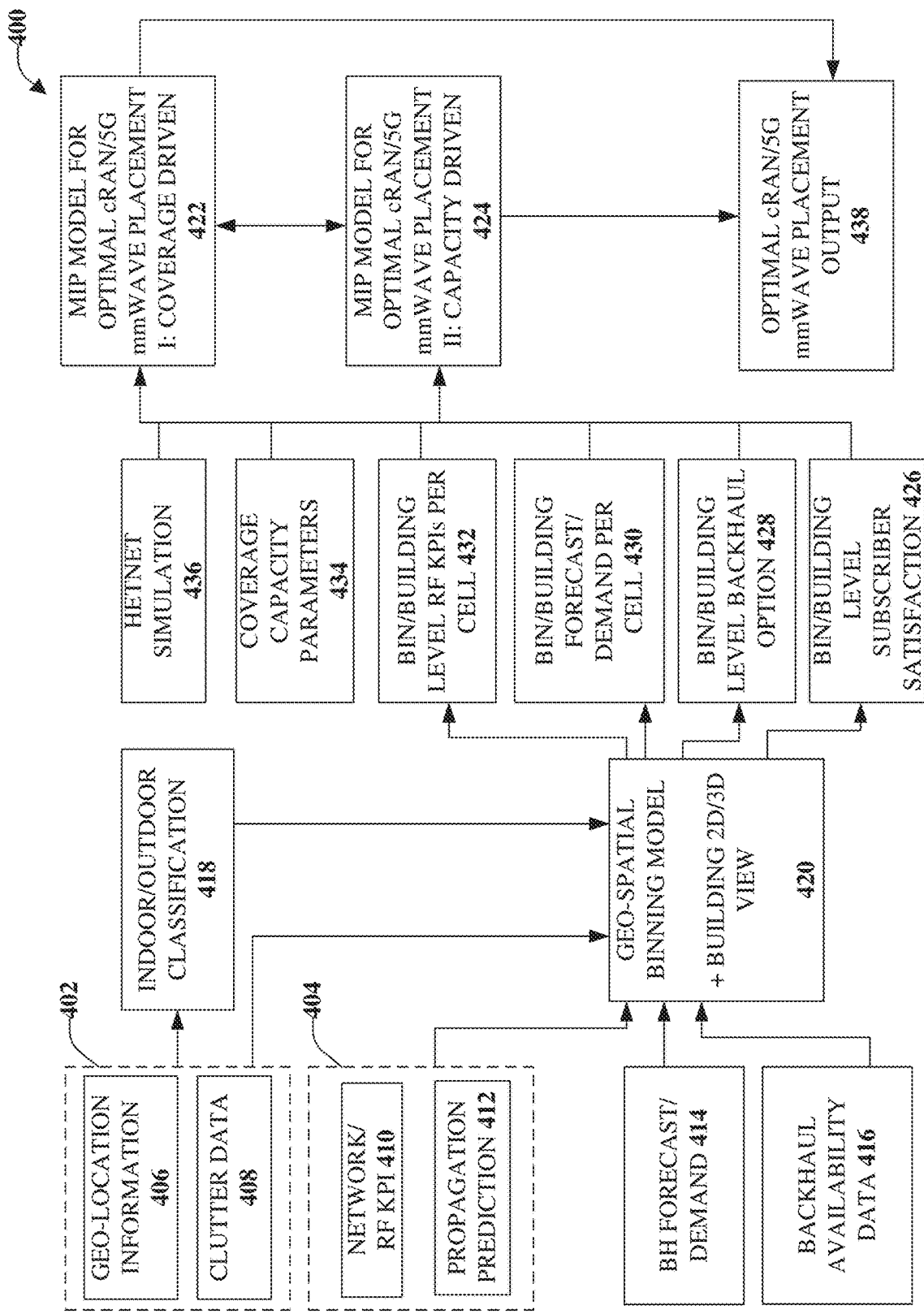
FIG. 4 illustrates an example, non-limiting, architecture of a system for use in advanced networks in accordance with one or more embodiments described herein.

FIG. 4 illustrates an example, non-limiting, architecture of a system 400 for use in advanced networks in accordance with one or more embodiments described herein. Repetitive description of like elements employed in other embodiments described herein is omitted for sake of brevity.

Input data can include a first set of input data 402 and at least a second set of input data 404 (e.g., the input data 302, the input feed 316). The first set of input data 402 can include, for example, geo-location information 406 and clutter data 408. The second set of input data 404 can include, for example, network and/or RF KPI 410 and propagation prediction 412. Other input data can include, but is not limited to backhaul forecast and/or demand 414 and backhaul availability data 416. Although illustrated and described with respect to backhaul forecast and/or demand 414, fronthaul forecast and/or demand information also can be input data and considered in the potential placement of one or more resources.

The first set of input data 402 can be categorized according to an indoor/outdoor classification 418. Placement of one or more resources can be dependent upon whether the placement is to support an indoor network or to support an outdoor network. For example, an indoor placement might be closer to other existing resources because of walls, where an RF condition might not be good due to the walls (or another signal interference). Thus, in and indoor environment, two or more resources can be placed close together because noise might not be a concern due to the obstruction (e.g., the wall). Further, indoor placement might allow closer proximity of two or more resources due to different networks. Therefore, one resource (or one cell) might be placed on each level or floor of a structure. Thus, indoor placement and outdoor placement can be designed differently and different models (or inputs to the model) can be different and the model (e.g., the MIP model) can consider different parameters depending on the placement environment.

The first set of input data 402, the second set of input data 404, the backhaul forecast and/or demand 414, the backhaul availability data 416 and/or the indoor/outdoor classification 418 can be inputs to a geo-spatial binning model 420. Further the geo-spatial binning model 420 can consider a building or other structure as a two-dimensional (2D) and/or three-dimensional (3D) view. In an example, the geo-spatial binning model 420 can divide an area under consideration into grids or bins (e.g., 25 millimeter (mm) by 25 mm areas), or other sized areas, which can be any geometric shape and is not limited to a square shape. Accordingly, each bin can have a predicted network traffic, a determined type (indoor or outdoor), RF data, and so on.

Output of the geo-spatial binning model 420 can be provided (as input to one or more MIP models, illustrated as a coverage driven model 422 and a capacity driven model 424 (or in some cases a combination coverage driven and capacity driven model)) based on, for example, bin/building level subscriber satisfaction 426, bin/building level backhaul option 428 (and/or fronthaul option), bin/building level forecast/demand per cell 430, and/or bin/building level RF KPIs per cell 432, for example. Further inputs to the coverage driven model 422 and/or the capacity driven model 424 can include coverage capacity parameters 434 and/or HetNet simulation 436. The coverage driven model 422 can be a model for optimal cRAN/5G mmWave placement. The capacity driven model 424 can be a MIP model for optimal cRAN/5G mmWave placement. Respective outputs of the coverage driven model 422 and the capacity driven model 424 can be optimal cRAN/5G mmWave placement outputs. It is noted that the coverage driven model 422, the capacity driven model 424, and/or a combination coverage and capacity driven model can be respective mixed integer programming models.

According to some implementations, the coverage driven model 422 and the capacity driven model 424 can make placement determinations independently from one other. In some implementations, an output of the coverage driven model 422 is provided as input to the capacity driven model 424. Alternatively, an output of the capacity driven model 424 is provided as input to the coverage driven model 422. In accordance with some implementations, a coverage and capacity model (not shown) can operate together with an overall objective being a weighted summation of the coverage and capacity objectives. Thus, the placement determination can be based on solving a combination of coverage and capacity issues. Constraints can also be combined in the model.

For example, a determination can be made related to coverage, given the macro situation; how can the whole area be covered better (e.g., via the coverage driven model 422). Once coverage has been determined, a determination can be made related to how much traffic can be offloaded from the macro. However, there might still be a lot of traffic that needs to be offloaded. Therefore, based on the coverage of a cell, a determination can be made as to what additional capacity can be obtained (e.g., via the capacity driven model 424). Accordingly, it is not just one level or one step, but can be two or more steps determined based on one another.

The following provides a mathematical model illustration for cRAN placement in accordance with one or more embodiments described herein. The cRAN placement can be based on a coverage driven approach (e.g., coverage optimization) and/or a capacity driven approach (e.g., capacity optimization).

For the coverage driven approach related to cRAN placement, a coverage optimization sample model: j is the grid (bin/building) id. There are two type objectives: Type 1 and Type II, using the following equations.

$$\text{Type I: Minimize } \frac{\text{grid\_nps}(j) \times \text{grid\_load}(j)}{\sum \text{grid\_load}(j)}. \quad \text{Equation 1.}$$

$$\text{Type II: Minimize count}_{node}, \quad \text{Equation 2.}$$
$$\text{s.t.} \quad \frac{\text{grid\_nps}(j) \times \text{grid\_load}(j)}{\sum \text{grid\_load}(j)} \le \text{nps\_bound}$$

The type I objective minimizes the load weighted coverage score. grid_nps presents the coverage network performance score (such as drop call/detractor ratio, for example) after placing cRAN nodes to bin or building unit. The lower the load weighted grid_nps the better.

The type II objective minimizes the number of cRAN nodes required to make the load weighted coverage score under a predefined threshold nps_bound.

For the capacity driven approach related to cRAN placement, a capacity optimization sample model to maximize the saving cost via offloading traffic from macrocells is utilized using the following equations:

$$\text{Maximize cost}_{split} \times \sum_i reduced_{split(i)} + \quad \text{Equation 3.}$$
$$(\text{cost})_{carrier} \times \sum_i reduced_{carrier(i)} - \sum_j \text{trans\_cost}(j) -$$
$$\text{fixed\_node\_cost} \times \sum_j [\text{indoor\_cnt}(j) + \text{outdoor\_cnt}(j)],$$
$$\text{s.t. } \text{cran}_{offload(i)} \ge \text{split}_{offload(i)} \cdot reduced_{split(i)}.$$
$$\text{cran\_offload}(i) \ge \text{carrier\_offload}(i) \cdot \text{reduced\_carrier}(i)$$

-continued $$\text{cran}_{offload(i)} =$$
$$\sum_j \text{traffic}_{ratio(i,j)} \times (\text{indoor}_{offload(j)} + \text{outdoor}_{offload(j)}),$$
$$\text{indoor}_{offload(j)} \le \text{cran}_{capacity} \times \text{indoor}_{cnt(j)},$$
$$\text{indoor}_{offload(j)} \le \text{indoor}_{traffic_{load(j)}},$$
$$\text{outdoor}_{offload(j)} \le \text{cran}_{capacity} \times \text{outdoor}_{cnt(j)},$$
$$\text{outdoor\_offload}(j) \le \text{outdoor\_traffic\_load}(j),$$

where i is cellsite and j is grid(bin/building) id. cRAN node is placed at grid level. Parameters: traffic_ratio(i,j) is the ratio of traffic served by cellsite i on grid j. split_offload (i), carrier_offload(i) are the traffic needs to be offloaded for cellsite i to avoid split or adding new carrier. Indoor_offload (j), outdoor_offload(j) are the traffic amount offloaded by cRAN node for indoor/outdoor of grid j. They are capped by the total traffic load of grid j: indoor_traffic_grid(j) and outdoor_traffic_grid(j), respectively. Trans_cost(j) is the transportation cost to have cRAN placed at grid j.

Further, variables: indoor_cnt(j) and outdoor_cnt(j) indicating if cRAN node is added to grid j. reduced_split(i) and reduced_carrier(i) are binary to indicate if corresponding reduction of cellsite i is successful.

The following provides a mathematical model illustration for 5G mmWave placement in accordance with one or more embodiments described herein. The 5G mmWave placement can be based on a coverage driven approach (e.g., coverage optimization) and/or a capacity driven approach (e.g., capacity optimization).

For the coverage driven approach related to the 5G mmWave placement, coverage optimization sample objectives: j is the grid(bin/building) id. There are two type objectives: Type 1 and Type II, using the following equations.

$$\text{Type I: Minimize } \frac{\text{grid\_nps}(j) \times \text{grid\_load}(j)}{\sum \text{grid\_load}(j)}. \quad \text{Equation 4.}$$

$$\text{Type II: Minimize count}_{node}, \quad \text{Equation 5.}$$
$$\text{s.t.} \quad \frac{\text{grid\_nps}(j) \times \text{grid\_load}(j)}{\sum \text{grid\_load}(j)} \le \text{nps\_bound}$$

Type I objective minimizes the 5G traffic load weighted coverage score. grid_nps presents the coverage 5G network performance score (such as drop call/detractor ratio) after placing 5G mmWave nodes to bin. The lower load weighted grid_nps the better.

Type II objective minimizes the number of 5G mmWave nodes required to make the load weighted coverage score under a fixed threshold nps_bound.

For the capacity driven approach related to 5G mmWave placement, capacity optimization sample objective to minimize the placement cost for targeted 5G demand:

Minimize node_cost×Σ[place_node(i)]+Σ[trans_cost (i)], s.t.

5G_outdoor_demand(j)≤Σ$_i$traffic_ratio(i,j)×5G_ node_capacity(i)×place_node(i) for grid j with 5G demand  Equation 6.

where i is node id and j is grid(bin) id.

Parameters: traffic_ratio(i,j) is the ratio of traffic on grid j served by node i. trans_cost(i) is the transportation cost to place a 5G mmWave node i. Node_cost is the hardware/software cost of each node. Variables: place_node(i) is the binary variable indicating whether a 5G mmWave node i is placed or is not placed.

There can also be a sequential algorithm for long term planning Given the forecast of future demands (t, t+1, t+2, ..., T) for long term, conduct dynamical programming (forward or backward recursion) to solve the optimal cRAN/5G mmWave placement solutions for each time period.

At each time period, MIP is performed to solve the optimal placement solution given corresponding budget constraint. Then, the global optimal solutions can be determined by the overall cost/saving which adds up all cost/saving at each time period weighted by a discount factor.

For example, dynamic programming can be utilized to solve the placement problem over time. Given a prediction for the network in, for example, five years, planning can be performed for the five year goal and planning, in reverse time order, can be also performed for more recent time periods (e.g., backwards from the fifth year). Then other considerations can be what should be done for the fourth year, what to do for the third year, the second year, and now. This can result in an optimal solution over time.

Further, the model can be redone or re-executed over time with updated input data (e.g., a feedback loop). Thus, the placement consideration is not performed once, but should be reanalyzed at defined time intervals (e.g., change in technology, some other event occurs, a certain time period has elapsed since the model was executed, and so on). For example, after one year, the solution might be re-run and additional planning can be performed. However, given current information the best decision at this moment is made.

Advantages or benefits of the cRAN and/or 5G mmWave placement as provided herein include, but are not limited to, efficient algorithms to solve cRAN/5G mmWave planning problem optimally. Optimized cRAN/5G mmWave placement solutions minimizing the deployment costs in short and long term. Flexible MIP models can be easily adapted to different scenarios (capacity driven, coverage driven, or a combination of both). The disclosed embodiments can be seamlessly integrated with a telecom carrier's existing forecast and planning applications and produce significant automation benefits.

Methods that can be implemented in accordance with the disclosed subject matter will be better appreciated with reference to various flow charts. While, for purposes of simplicity of explanation, the methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g., device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Figure 5:
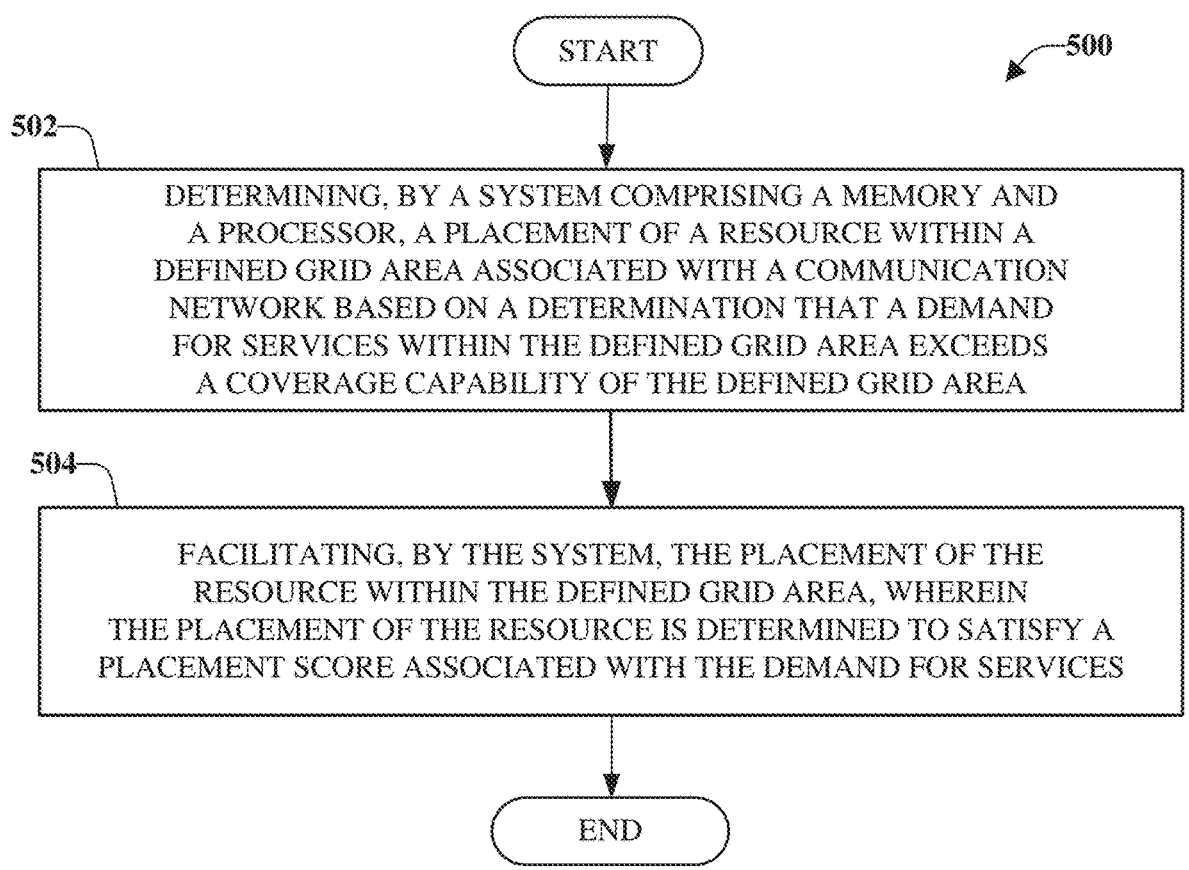
FIG. 5 illustrates a flow diagram of an example, non-limiting, computer-implemented method for facilitating placement of one or more resources in advanced heterogeneous networks based on a coverage driven approach in accordance with one or more embodiments described herein.

FIG. 5 illustrates a flow diagram of an example, non-limiting, computer-implemented method 500 for facilitating placement of one or more resources in advanced heterogeneous networks based on a coverage driven approach in accordance with one or more embodiments described herein. Repetitive description of like elements employed in other embodiments described herein is omitted for sake of brevity.

The computer-implemented method 500 starts, at 502, when a system comprising a memory and a processor determines candidate locations for placement of a resource (or more than one resource) within a defined grid area associated with a communication network (e.g., via the MIP model 320, the geo-spatial binning model 420, the coverage driven model 422, and/or the capacity driven model 424). The determination related to the candidate locations can be based on a determination that a demand for services within the defined grid area exceeds a coverage capability of the defined grid area. The system can be, for example, the apparatus 300 of FIG. 3 and/or the system 400 of FIG. 4.

According to some implementations, determining the candidate locations for placement of the resource can include using a model built on resource placement via employment of mixed integer programming. Further, the resource placement can consider short term planning and long term planning for the defined grid area.

In some implementations, determining the candidate locations for the placement of the resource can include receiving, by the system, one or more conditions identified for the defined grid area and transforming, by the system, the one or more conditions into input data for a mixed integer programming model. The input data can include at least one constraint of the mixed integer programming model and at least one objective of the mixed integer programming model.

At 504 of the computer-implemented method 500, the system can facilitate the placement of the resource within the defined grid area (e.g., via the at least one user interface 324). The placement of the resource can be determined to satisfy the demand for services. In an example, facilitating the positioning can include outputting, such as on a display of a computing device, an indication of a location of the resource.

According to some implementations, the computer-implemented method 500 can include rendering, by the system, an indication of the placement of the resource within the defined grid area on a display area of a user equipment. For example, the indication can be rendered or output on a user interface (e.g., via the at least one user interface 324) in conjunction with an electronic mapping application.

In an example, prior to determining the candidate locations for placement of the resource, the computer-implemented method 500 can include determining, by the system, that a number of dropped communications within the defined grid area exceeds a defined dropped communication level (e.g., considering that some communications will be dropped or lost, however, an excessive amount of dropped communications is unacceptable). Although discussed with respect to dropped communications, other coverage based determinations can be made.

The resource can be, according to some implementations, a cRAN node. Accordingly, determining the placement, at 502, can include utilizing equation 1 discussed above based on an objective being to minimize a load weighted coverage score. Alternatively, or additionally, determining the placement, at 502, can include utilizing equation 2 discussed above based on an objective being to minimize the number of cRAN nodes needed in the network.

Additionally (if there is more than one resource added into the network), or alternatively, the resource can be a 5G mmWave node, determining the candidate locations for placement, at 502, can include utilizing equation 4 discussed above based on an objective being to minimize a 5G traffic load weighted coverage score. Alternatively, or additionally, determining the placement, at 502, can include utilizing equation 5 discussed above based on an objective being to minimize the number of 5G mmWave nodes needed in the network.

Figure 6:
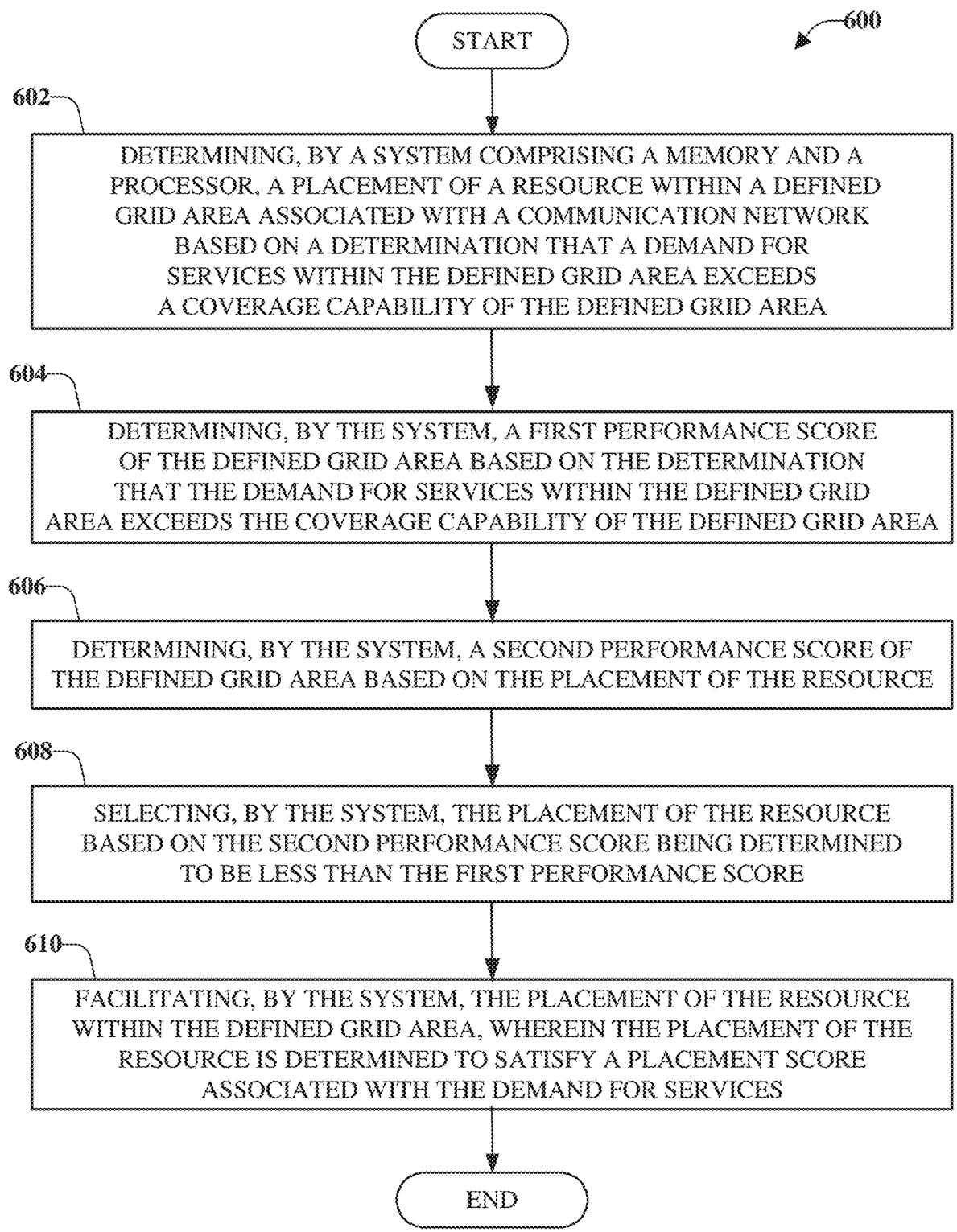
FIG. 6 illustrates a flow diagram of an example, non-limiting, computer-implemented method for facilitating placement of one or more resources of advanced heterogeneous communications networks based on a first objective type in accordance with one or more embodiments described herein.

FIG. 6 illustrates a flow diagram of an example, non-limiting, computer-implemented method 600 for facilitating placement of one or more resources of advanced heterogeneous communications networks based on a first objective type in accordance with one or more embodiments described herein. Repetitive description of like elements employed in other embodiments described herein is omitted for sake of brevity.

At 602 of the computer-implemented method 600, a system comprising a memory and a processor, can determine candidate locations for placement of a resource (or more than one resource) within a defined grid area associated with a communication network based on a determination that a demand for services within the defined grid area exceeds a coverage capability of the defined grid area. The candidate locations for placement of the resource can be determined to satisfy the demand for services. For example, the demand for services can be determined to be satisfied based on a performance score determined for the defined grid area.

Further, to determine the candidate locations for the placement, the computer-implemented method 600 can, at 604, determine a first performance score of the defined grid area based on the determination that the demand for services within the defined grid area exceeds the coverage capability of the defined grid area. At 606, a second performance score of the defined grid area can be determined based on the placement of the resource.

Further, at 608 the candidate locations for placement of the resource can be selected based on the second performance score being determined to be less than the first performance score. The computer-implemented method 600 can include, at 610, facilitating the placement of the one or more resources within the defined grid area (e.g., via the at least one user interface 324). Facilitating the placement can include outputting the candidate locations in a perceivable format to another device (e.g., a UE).

Thus, at 604, a current performance score (e.g., the first performance score) can be determined based on the current network topology. Further, an expected or predicted performance score (e.g., the second performance score) that can be achieved after the placement of the one or more new or additional resources can be determined, at 606.

According to some implementations, the resource is a cloud radio access network node. Further to these implementations, the selection of the candidate locations, at 608, can be based on retaining a traffic load weighted coverage score of the defined grid area below a threshold load weighted coverage score level. Thus, the candidate locations for the placement can be based on the particular placement of the one or more resources minimizing the load weighted coverage score, as discussed above with respect to Equation 1.

In some implementations, the resource is a fifth generation millimeter wave node that communicates according to a fifth generation millimeter wave protocol. Further to these implementations, the selection at 608, can be based on retaining a fifth generation traffic load weighted coverage score of the defined grid area below a threshold load weighted coverage score level. Thus, the selection of the candidate locations can be based on the placement of the one or more resources minimizing the load weighted coverage score, as discussed above with respect to Equation 4.

Thus, it can be determined if there is a need of placement and its corresponding impact on the network. Impact costs include cost, benefit and/or score in terms of coverage, capacity, and so on. If there are potential locations for small cells, those locations can be added to the candidate pool. The selection of the placement of resource in the candidate pool can be made via solving the MIP problem globally (e.g., with an MIP solver or dynamic programming, and so on). The output of the MIP indicates the placement of the resources satisfying the defined constraints and balancing the tradeoffs in objective.

Figure 7:
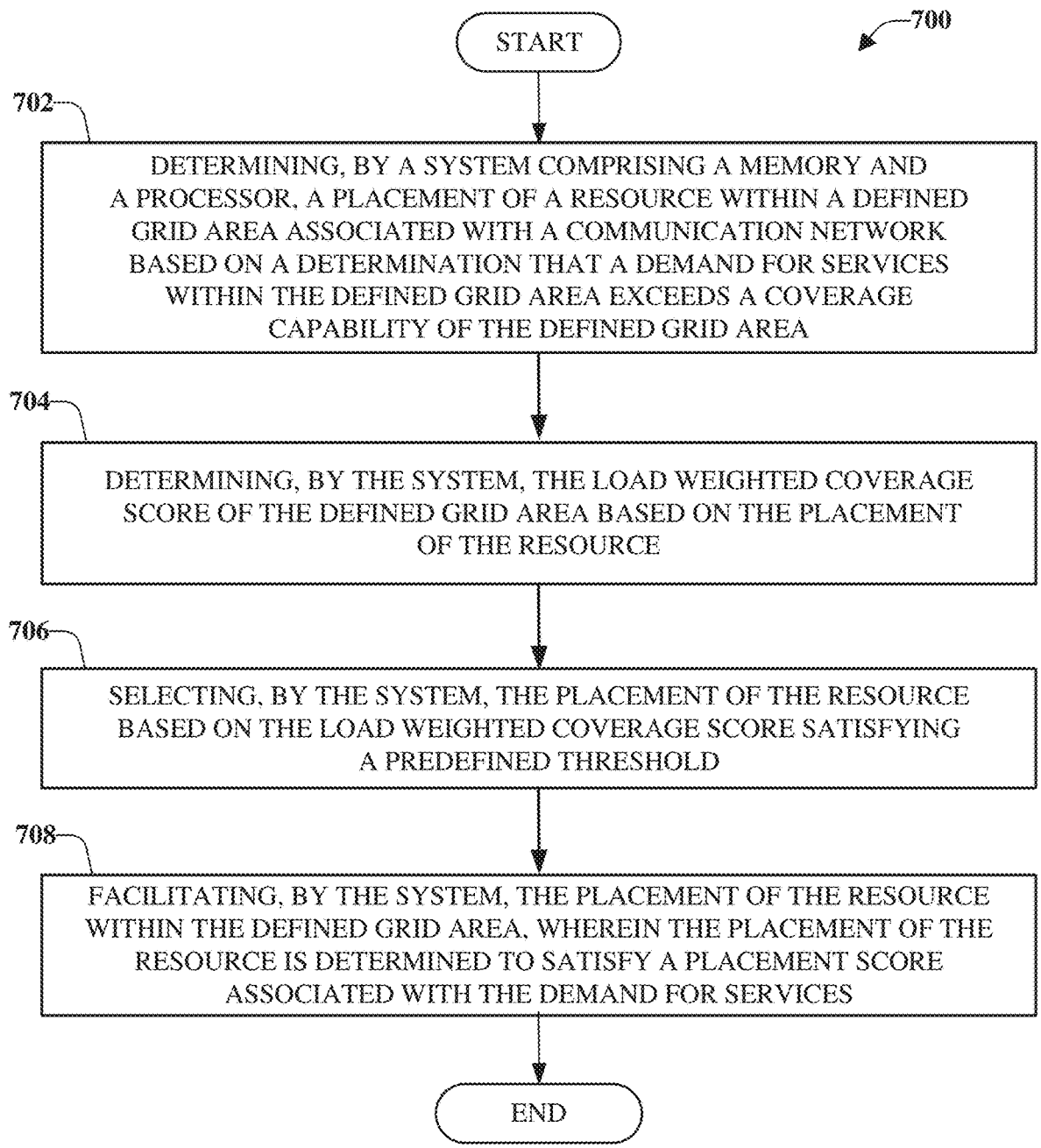
FIG. 7 illustrates a flow diagram of an example, non-limiting, computer-implemented method for facilitating placement of one or more resources in an advanced heterogeneous communications network based on a second objective type in accordance with one or more embodiments described herein.

FIG. 7 illustrates a flow diagram of an example, non-limiting, computer-implemented method 700 for facilitating placement of one or more resources in an advanced heterogeneous communications network based on a second objective type in accordance with one or more embodiments described herein. Repetitive description of like elements employed in other embodiments described herein is omitted for sake of brevity.

At 702 of the computer-implemented method 700, a system comprising a memory and a processor, can determine one or more candidate locations for placement of a resource within a defined grid area associated with a communication network based on a determination that a demand for services within the defined grid area exceeds a coverage capability of the defined grid area. The candidate locations for the placement of the resource can be determined to satisfy a determined demand for services in at least a portion of a coverage area. The demand for services can be based on capacity and/or coverage needs of at least the portion of the coverage area. For example, the determination can be based on a load weighted coverage score.

Further, to determine the candidate locations, the computer-implemented method 700 can, at 704, determine the load weighted coverage score of the defined grid area based on the placement of the resource. At 706, the one or more candidate locations for the placement of the resource can be selected based on the load weighted coverage score satisfying a predefined threshold. The computer-implemented method 700 can include, at 708, facilitating the placement of the one or more resources within the defined grid area (e.g., via the at least one user interface 324).

According to some implementations, the resource is a cloud radio access network node. Further to these implementations, the load weighted coverage score is selected to retain a quantity of cloud radio access network nodes located in the defined grid area below a defined quantity. Thus, the candidate locations can be based on the placement of the one or more resources at the candidate locations minimizing the number of cRAN nodes needed to make the load weighted coverage score under a predefined threshold, as discussed above with respect to Equation 2.

In some implementations, the resource is a fifth generation millimeter wave node that communicates according to a fifth generation millimeter wave protocol. Further to these implementations, the load weighted coverage score is selected to restrict a quantity of fifth generation millimeter wave nodes in the defined grid area below a defined quantity. Thus, the candidate locations for the placement can be based on a placement of the one or more resources at the one or more candidate locations minimizing the number of 5G mmWave nodes deeded to make the load weighted coverage score under a fixed threshold nps_bound as discussed above with respect to Equation 5.

According to some implementations, both cRAN nodes and 5G mmWave nodes can be selectively placed in a network or a portion thereof (e.g., grid area, bin area, and so on). The determination of the type of resources and the potential placement locations of such resources can be based on one or more objectives, which can be included as input data to the model as discussed herein.

Figure 8:
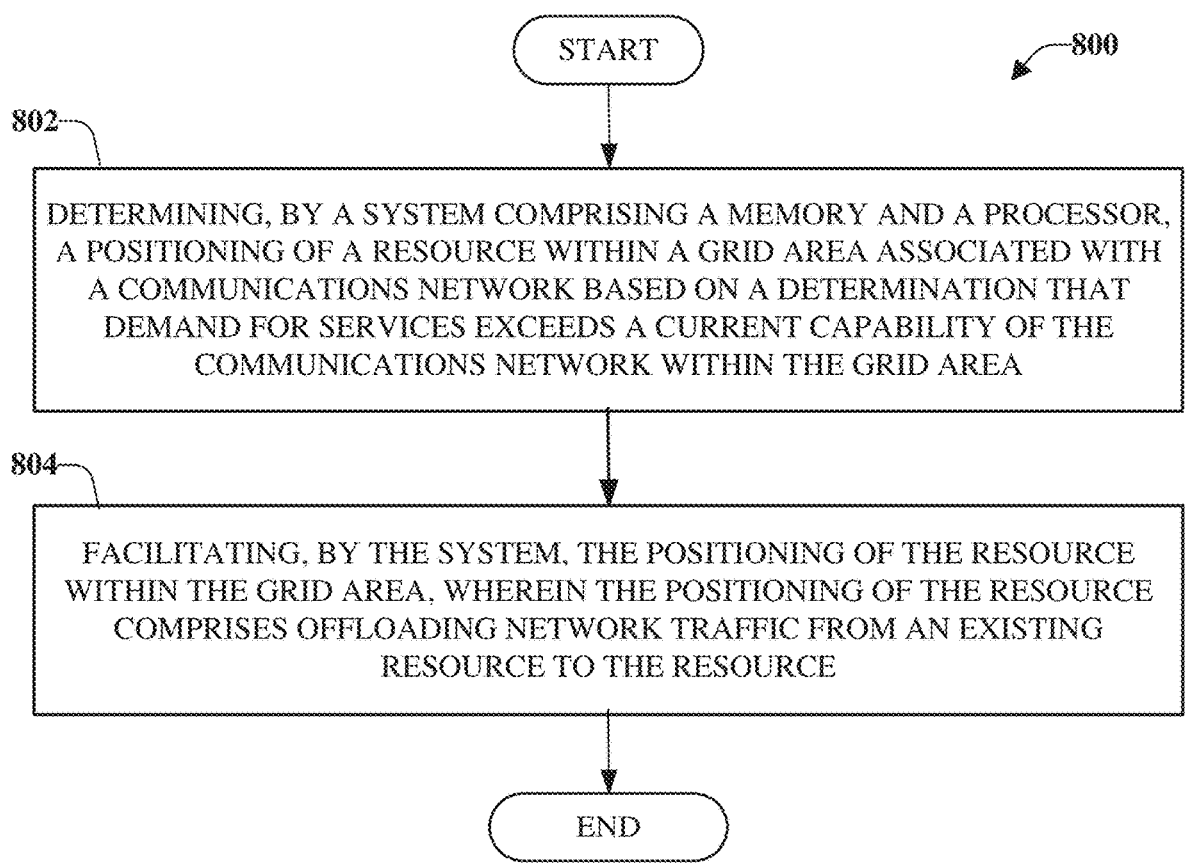
FIG. 8 illustrates a flow diagram of an example, non-limiting, computer-implemented method for facilitating placement of one or more heterogeneous resources based on a capacity driven approach in advanced networks in accordance with one or more embodiments described herein.

FIG. 8 illustrates a flow diagram of an example, non-limiting, computer-implemented method 800 for facilitating placement of one or more heterogeneous resources based on a capacity driven approach in advanced networks in accordance with one or more embodiments described herein. Repetitive description of like elements employed in other embodiments described herein is omitted for sake of brevity.

At 802 of the computer-implemented method 800, a system comprising a memory and a processor can determine candidate locations for positioning a resource within a grid area associated with a communications network based on a determination that demand for services exceeds a current capability of the communications network within the grid area. The demand for services can be a current demand for services or an expected demand for services in a defined time period.

Further, at 804, the system can facilitate the positioning of the resource within the grid area. Positioning of the resource can include offloading network traffic from an existing resource to the resource.

According to some implementations, the communications network is a heterogeneous network and the existing resource is a macrocell. Further to these implementations, the computer-implemented method 800 can include offloading network traffic from the macrocell to a cloud radio access network node associated with the communications network as discussed above with respect to Equation 3. Further to these implementations, the offloading can include avoiding a carrier split within the communications network. Alternatively, or additionally, the offloading can include maintaining a number of carriers for the communications network.

In some implementations, the communications network is a heterogeneous network, the existing resources are macrocells, and the demand for services is classified as fifth generation services. Further to these implementations, facilitating the positioning includes offloading network traffic from the macrocells to a fifth generation millimeter wave node as discussed above with respect to Equation 6.

In some implementations, prior to the facilitating the positioning of the resource, at 804, the computer-implemented method 800 can include evaluating, by the system, a value associated with the positioning (e.g., the candidate location). The facilitating can be performed based on a determination that the value satisfies a function with respect to a defined value.

For example, the candidate locations (or candidate pool of resources) can be determined by an MIP model, which can receive input data or input parameters that are defined as placement scores (e.g., cost, coverage, capacity offload, and so on). The MIP model is solved to determine the most optimal placement of the resources (e.g., cRAN, mmWave, or a combination thereof).

Figure 9:
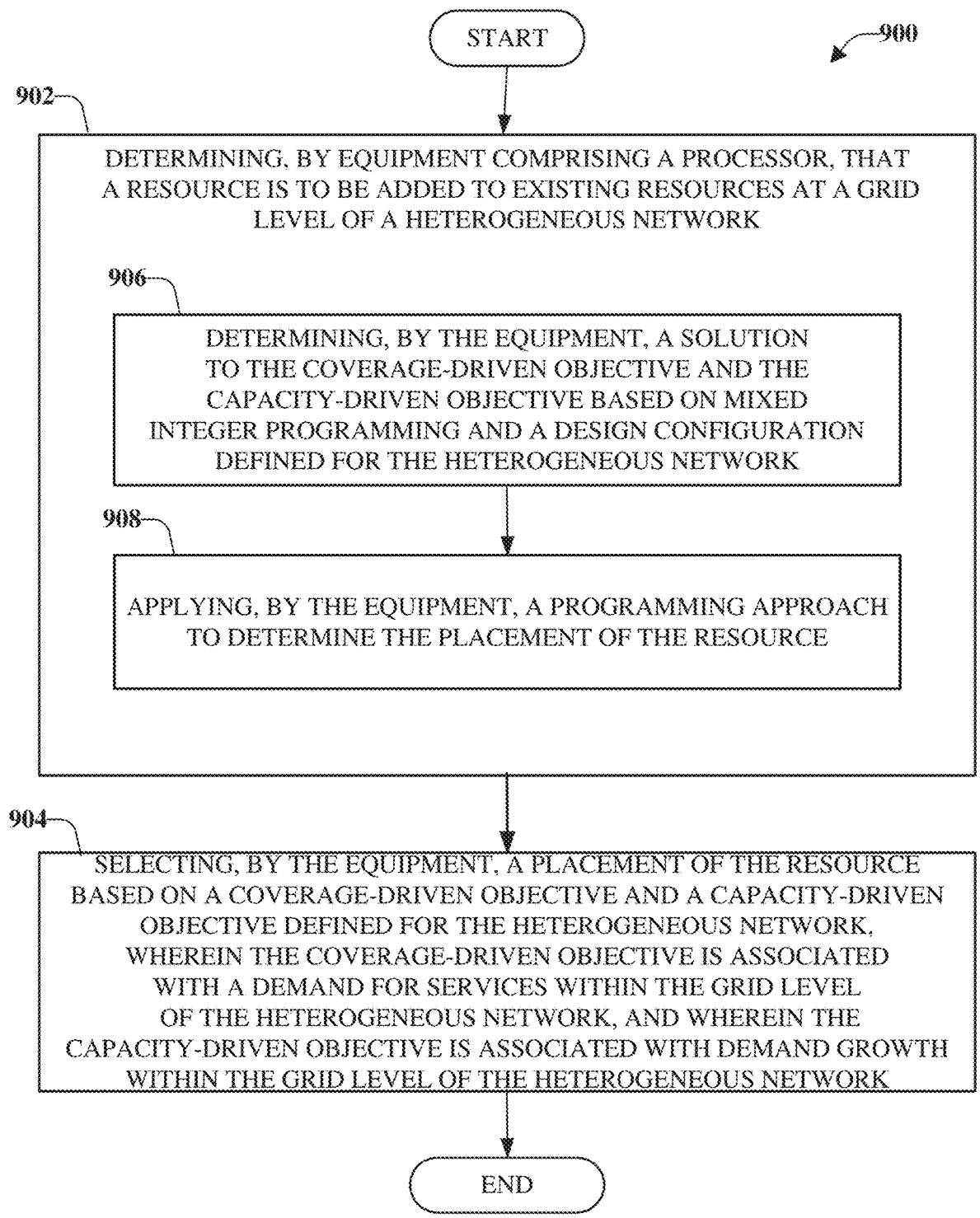
FIG. 9 illustrates a flow diagram of an example, non-limiting, computer-implemented method for facilitating placement of one or more resources based on both a coverage driven approach and a capacity driven approach in advanced heterogeneous communications networks in accordance with one or more embodiments described herein.

FIG. 9 illustrates a flow diagram of an example, non-limiting, computer-implemented method 900 for facilitating placement of one or more resources based on both a coverage driven approach and a capacity driven approach in advanced heterogeneous communications networks in accordance with one or more embodiments described herein. Repetitive description of like elements employed in other embodiments described herein is omitted for sake of brevity.

The computer-implemented method 900 starts, at 902, with a determination that a resource is to be added to existing resources at a grid level of a heterogeneous network. In some cases, more than one resource can be added to the existing resources. The one or more resources can be one or more cRAN nodes and/or one or more 5G mmWave nodes.

At 904, candidate locations for placement of the resource can be selected based on a coverage-driven objective and a capacity-driven objective defined for the heterogeneous network. The coverage-driven objective can be associated with a demand for services within the grid level of the heterogeneous network. The capacity-driven objective can be associated with demand growth within the grid level of the heterogeneous network.

In some implementations, the selection, at 902 can include, determining, at 906, a solution to the coverage-driven objective and the capacity-driven objective based on mixed integer programming and a design configuration defined for the heterogeneous network. Further, the selection can include applying, at 908, a programming approach to determine the placement of the resource.

Figure 10:
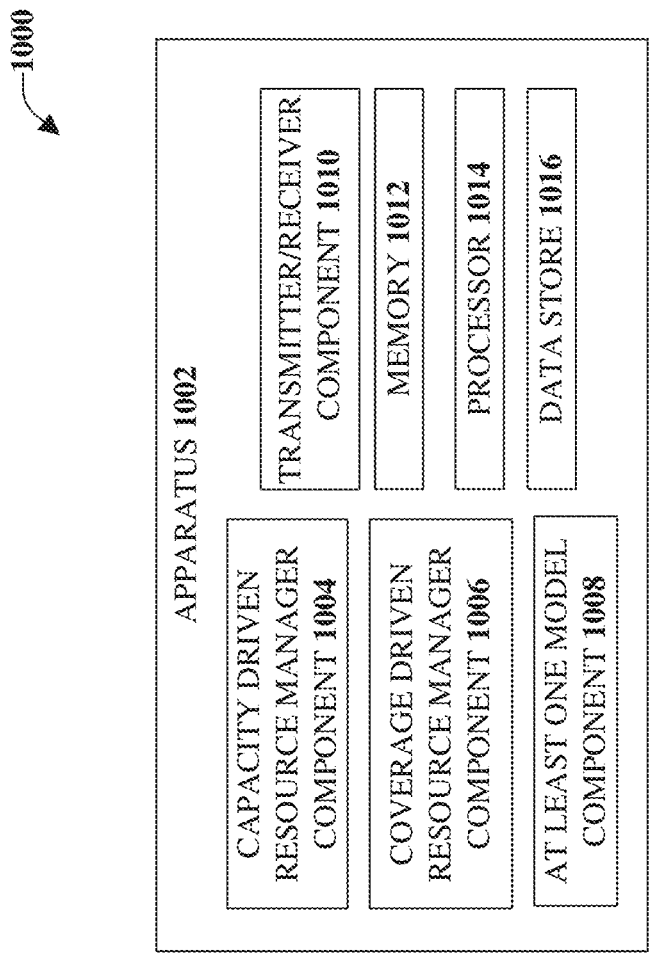
FIG. 10 illustrates an example, non-limiting, system that facilitates selection and placement of one or more resources within a heterogeneous communications network in accordance with one or more embodiments described herein.

FIG. 10 illustrates an example, non-limiting, system 1000 that facilitates selection and placement of one or more resources within a heterogeneous communications network in accordance with one or more embodiments described herein. The heterogeneous communications network can be an advanced network, (e.g., a 5G network, a 6G network, and so on). Repetitive description of like elements employed in other embodiments described herein is omitted for sake of brevity. The system 1000 can include one or more of the components and/or functionality of the apparatus 300, the system 400, the computer-implemented methods, and vice versa.

The system 1000 can include an apparatus 1002 that can include a capacity driven resource manager component 1004, a coverage driven resource manager component 1006, at least one model component 1008, a transmitter/receiver component 1010, at least one memory 1012, at least one processor 1014, and at least one data store 1016.

Aspects of systems (e.g., the system 1000 and the like), apparatuses (e.g., the apparatus 1002), or processes explained in this disclosure can constitute machine-executable component(s) embodied within machine(s) (e.g., embodied in one or more computer readable mediums (or media) associated with one or more machines). Such component(s), when executed by the one or more machines (e.g., computer(s), computing device(s), virtual machine(s), and so on) can cause the machine(s) to perform the operations described.

In various embodiments, the apparatus 1002 can be any type of component, machine, device, facility, apparatus, and/or instrument that includes a processor and/or can be capable of effective and/or operative communication with a wired and/or wireless network. Components, machines, network equipment, user equipment, devices, facilities, and/or instrumentalities that can include the apparatus 1002 can include tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, heretofore non-commercialized or concept devices (e.g., Internet Protocol (IP) aware contact lenses), and the like.

The capacity driven resource manager component 1004 can evaluate a current network configuration or topology and determine whether one or more additional resources should be placed in the network based on capacity considerations. If one or more resources should be placed in the network, the capacity driven resource manager component 1004 and the at least one model component 1008 can determine respective candidate locations for the one or more additional resources. Additionally, the capacity driven resource manager component 1004 can determine the type of resource (e.g., cRAN node, 5G mmWave node, and so on) that should be added.

The determination by the capacity driven resource manager component 1004 and/or the at least one model component 1008 can be based on Equation 3 (for cRAN placement) and based on a consideration to maximize the saving costs via offloading traffic from macrocells. Additionally, or alternatively, the determination by the capacity driven resource manager component 1004 and/or the at least one model component 1008 can be based on Equation 6 (for 5G mmWave placement) discussed above and based on a consideration to minimize the placement cost for targeted 5G demand. Further, to facilitate the determination, the capacity driven resource manager component 1004 can perform functions as discussed with respect to the computer-implemented method 800 and/or the computer-implemented method 900.

The coverage driven resource manager component 1006 can evaluate a current network configuration or topology and determine whether one or more additional resources should be placed in the network based on coverage considerations. If one or more resources should be placed in the network, the coverage driven resource manager component 1006 can determine respective potential locations of the one or more additional resources. Additionally, the coverage driven resource manager component 1006 can determine the type of resource (e.g., cRAN node, 5G mmWave node, and so on).

The determination by the coverage driven resource manager component 1006 and/or the at least one model component 1008 can be based on Equation 1 (for cRAN placement) and based on a consideration to minimize the load weighted coverage score. In another example, the determination by the coverage driven resource manager component 1006 and/or the at least one model component 1008 can be based on Equation 2 (for cRAN placement) and based on a consideration to minimize the number of cRAN nodes needed to make the load weighted coverage score under a predefined threshold.

Additionally, or alternatively, the determination by the coverage driven resource manager component 1006 and/or the at least one model component 1008 can be based on Equation 4 (for 5G mmWave placement) discussed above and based on a consideration to minimize the 5G traffic load weighed coverage score. In another example, the determination by the coverage driven resource manager component 1006 and/or the at least one model component 1008 can be based on Equation 5 (for 5G mmWave placement) discussed above and based on a consideration to minimize the number of 5G mmWave nodes needed to make the load weighted coverage score under a fixed threshold nps_bound.

Further, to facilitate the determination, the coverage driven resource manager component 1006 and/or the at least one model component 1008 can perform functions as discussed with respect to the computer-implemented method 500, the computer-implemented method 600, the computer-implemented method 700, and/or the computer-implemented method 900.

The at least one model component 1008 (e.g., an automated learning and reasoning component) can employ automated learning and reasoning procedures (e.g., the use of explicitly and/or implicitly trained statistical classifiers) in connection with performing inference and/or probabilistic determinations and/or statistical-based determinations in accordance with one or more aspects described herein.

For example, the at least one model component 1008 can employ principles of probabilistic and decision theoretic inference. Additionally, or alternatively, the at least one model component 1008 can rely on predictive models constructed using automated learning and/or automated learning procedures. Logic-centric inference can also be employed separately or in conjunction with probabilistic methods.

The at least one model component 1008 can infer parameters of a network that should be utilized as inputs for the purposes of analysis and placement of one or more resources within the network to satisfy coverage and/or capacity considerations. Based on the input data, the at least one model component 1008 can make an inference based on how many additional resources should be placed in the network, the location (or candidate locations) of the additional resources, the type of the additional resources, and so on.

As discussed herein, small cell placement is built as an optimization (MIP) problem. The optimization can be solved to determine the small cell locations (e.g., placement), which is a subset of candidate locations. The model can be built as a mixed integer programming (MIP) model, which involves integer variables and linear equations. In some implementations, to solve a MIP model to derive an optimal solution, an MIP solver can be utilized. When the model is determined to be too complicated (e.g., long term planning), dynamic programming and/or sequential algorithm can be used to solve the MIP problem. The solution of the MIP problem is the placement of small cells. Accordingly, the disclosed embodiments can transform different types of network requirements and/or conditions into MIP model's constraints and objectives.

As used herein, the term "inference" refers generally to the process of reasoning about or inferring states of a network, a system, a component, a module, an environment, and/or devices from a set of observations as captured through events, reports, data and/or through other forms of communication. Inference can be employed to identify strategic locations of one or more resources, or can generate a probability distribution over states, for example. The inference can be probabilistic. For example, computation of a probability distribution over states of interest based on a consideration of data and/or events. The inference can also refer to techniques employed for composing higher-level events from a set of events and/or data. Such inference can result in the construction of new events and/or actions from a set of observed events and/or stored event data, whether or not the events are correlated in close temporal proximity, and whether the events and/or data come from one or several events and/or data sources. Various classification schemes and/or systems (e.g., support vector machines, neural networks, logic-centric production systems, Bayesian belief networks, fuzzy logic, data fusion engines, and so on) can be employed in connection with performing automatic and/or inferred action in connection with the disclosed aspects.

If the at least one model component 1008 has uncertainty related to the intent or request, the at least one model component 1008 can automatically engage in a short (or long) dialogue or interaction with the entity (e.g., "what is a concern to be addressed for this network (e.g., capacity, coverage), what-if scenarios, and so on). In accordance with some aspects, the at least one model component 1008 engages in the dialogue with the entity through another system component. Computations of the value of information can be employed to drive the asking of questions. Alternatively or additionally, a cognitive agent component (not shown) and/or the at least one model component 1008 can anticipate actions (e.g., "should a report be generated related to the current and/or updated network parameters") and continually, periodically, or based on another interval, update a hypothesis as more object actions are gathered. The cognitive agent component can accumulate data or perform other actions that are a result of anticipation of future actions, future needs, and so on.

The various aspects (e.g., in connection with analyzing a heterogeneous network determining whether to add one or more resources to the network, and the location (or candidate locations) of such resources, and so forth) can employ various artificial intelligence-based schemes for carrying out various aspects thereof. For example, a process for determining if a particular coverage and/or capacity goal is non-changeable or if the goal is flexible can be enabled through an automatic classifier system and process.

A classifier is a function that maps an input attribute vector, x=(x1, x2, x3, x4, xn), to a confidence that the input belongs to a class. In other words, f(x)=confidence (class). Such classification can employ a probabilistic and/or statistical-based analysis (e.g., factoring into the analysis utilities and costs) to provide a prognosis and/or infer one or more actions that should be employed to determine locations of one or more additional resources in a network based on various goals determined for the network.

A Support Vector Machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that can be similar, but not necessarily identical to training data. Other directed and undirected model classification approaches (e.g., naïve Bayes, Bayesian networks, decision trees, neural networks, fuzzy logic models, and probabilistic classification models) providing different patterns of independence can be employed. Classification as used herein, can be inclusive of statistical regression that is utilized to develop models of priority.

One or more aspects can employ classifiers that are explicitly trained (e.g., through a generic training data) as well as classifiers that are implicitly trained (e.g., by observing network behavior, by observing user equipment behavior (and/or the behavior of respective entities associated with the user equipment, within a defined grid area, by receiving extrinsic information, and so on). For example, SVMs can be configured through a learning or training phase within a classifier constructor and feature selection module. Thus, a classifier(s) can be used to automatically learn and perform a number of functions, including but not limited to determining, according to a predetermined criterion, when to implement a new resource in a network, which resource type to be added, whether the addition of the resource satisfies the goal (e.g., feedback loop after implementation of the resource in the network), and so forth.

Additionally, or alternatively, an implementation scheme (e.g., a rule, a policy, and so on) can be applied to control and/or regulate placement of resources. In some implementations, based upon a predefined criterion, the rules-based implementation can automatically and/or dynamically implement placement of resources. In response thereto, the rule-based implementation can automatically interpret and carry out functions associated with the resources by employing a predefined and/or programmed rule(s) based upon any desired criteria.

The transmitter/receiver component 1010 can receive, from user equipment (not shown), network equipment (not shown), another apparatus (not shown), and/or another system (not shown) one or more parameters that can be utilized as input data, one or more network considerations (e.g., capacity driven information, coverage driven information, and so on) in order to analysis one or more network and determine placement of respective one or more resources in the one or more networks, and/or other information.

The at least one memory 1012 can be operatively connected to the at least one processor 1014. The at least one memory 1012 can store executable instructions that, when executed by the at least one processor 1014 can facilitate performance of operations. Further, the at least one processor 1014 can be utilized to execute computer executable components stored in the at least one memory 1012.

For example, the at least one memory 1012 can store protocols associated with facilitating placement of one or more resources in various heterogeneous networks and/or portions of such networks (e.g., divide network into grids or bins) in advanced networks as discussed herein. Further, the at least one memory 1012 can facilitate action to control communication between the apparatus 1002, other apparatuses, other systems, and/or user equipment and/or network equipment associated with the network(s) under consideration, and so on, such that the apparatus 1002 can employ stored protocols and/or algorithms to facilitate analysis and placement of resources in advanced networks as described herein.

It should be appreciated that data stores (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically Programmable ROM (EPROM), Electrically Erasable ROM (EEPROM), or flash memory. Volatile memory can include Random Access Memory (RAM), which acts as external cache memory. By way of example and not limitation, RAM is available in many forms such as Synchronous RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), and Direct Rambus RAM (DRRAM). Memory of the disclosed aspects are intended to include, without being limited to, these and other suitable types of memory.

The at least one processor 1014 can facilitate respective analysis of information related to placement of resources in advanced networks. The at least one processor 1014 can be a processor dedicated to analyzing and/or generating information received, a processor that controls one or more components of the apparatus 1002, and/or a processor that both analyzes and generates information received and controls one or more components of the apparatus 1002.

Further, the term network equipment is used herein to refer to any type of network node serving UE and/or connected to other network equipment, network nodes, network elements, or another network node from which the UEs can receive a radio signal. In cellular radio access networks (e.g., universal mobile telecommunications system (UMTS) networks), network nodes can be referred to as base transceiver stations (BTS), radio base station, radio network nodes, base stations, NodeB, eNodeB (e.g., evolved NodeB), and so on. In 5G terminology, the network nodes can be referred to as gNodeB (e.g., gNB) devices. Network nodes can also include multiple antennas for performing various transmission operations (e.g., MIMO operations). A network node can include a cabinet and other protected enclosures, an antenna mast, and actual antennas. Network nodes can serve several cells, also called sectors, depending on the configuration and type of antenna. Examples of network nodes can include but are not limited to: NodeB devices, base station (BS) devices, access point (AP) devices, and radio access network (RAN) devices. The network nodes can also include multi-standard radio (MSR) radio node devices, comprising: an MSR BS, an eNode B, a network controller, a Radio Network Controller (RNC), Base Station Controller (BSC), a relay, a donor node controlling relay, a Base Transceiver Station (BTS), an Access Point (AP), a transmission point, a transmission node, a Remote Radio Unit (RRU), a Remote Radio Head (RRH), nodes in distributed antenna system (DAS), and the like.

Described herein are apparatuses, devices, equipment, systems, methods, articles of manufacture, and other embodiments or implementations that can facilitate heterogeneous network analysis and resource planning for advanced networks. As discussed, provided is HetNet Analysis and Resource Planning (HARP). The various embodiments relate to using mixed integer programming and dynamic programming to optimize cRAN/5G mmWave planning in both short term and long term (e.g., five years or longer). The disclosed embodiments also provide cRAN/5G mmWave budget recommendation based on network performance and capital cost (e.g., investment for the network). The disclosed embodiments incorporate various factors that impact cRAN/5G mmWave planning to generate the optimal solution. The factors include (but not limited to) the following: network quality indicator; network traffic load; safe RF condition; terrain clutter type and building 2D/3D view; indoor/outdoor different scenarios; cell split/new carrier cost; transportation cost (backhaul facility, fronthaul facility); cRAN and/or 5G unit expense (equipment cost). A multi-step solution is employed in the mixed integer programming model to handle coverage and capacity driven scenarios simultaneously or separately. The disclosed embodiments also provides a software implementation to enable cRAN/5G mmWave planning via an interactive user interface.

A problem solved with the various embodiments provided herein is, given the explosive demand in mobility network and the advent of many 5G use cases, cRAN and 5G mmWave are important solutions to address RAN capacity/coverage needs and new 5G use cases. The number of cRAN/5G mmWave nodes needed will scale massively over the next few years. How to plan and place those nodes optimally in large scale is a challenging problem considering limited resources, rising demands, and interference among cells. Traditional design methods are usually very time consuming Heuristic algorithms are usually sub-optimal to plan and place the nodes on a market wide basis. As discussed herein, a mixed integer programming (MIP) method is used to consider different constraints (e.g., resources, demand, interference, and so on) separately or together to seek an optimal placement solution. This process is automated and can be easily deployed nationwide. The solution provides a cRAN and 5G mmWave design template so that RF engineers, for example, can make further fine tunings before construction and deployment in an optimal implementation. An objective of the disclosed embodiments is to maximize market wide heterogeneous network (HetNet) coverage and capacity in a holistic approach: address coverage holes to improve signal quality; off-load macrocells to avoid spectrum exhaust and enhance network performance; provide 5G capability to support corresponding use cases; improve the overall network capacity and throughput; minimize backhaul cost cRAN and/or 5G mmWave planning and placement requires consideration of multiple factors including: different indoor and outdoor requirements; overall HetNet coverage and capacity; cost of transport; cost of attachment structures; HetNet interference design criteria; net financial saving over competing capacity options such as macrocell carrier add, cell splits and new site builds.

Traditionally, for cRAN/5G mmWave planning: cRAN/5G mmWave nodes are placed based on marketing and customer feedback; define multiple scores for target design areas according to collected network information such as traffic load, signal strength, key performance indicator (KPI), net promoter score (NPS) etc.; apply empirical weights to the defined scores and rank order potential cRAN/5G mmWave sites subject to a budget constraint. Further, traditionally, a third party design tool that typically uses heuristic algorithms is utilized to produce sub-optimal solutions. These traditional methods need significant manual efforts. Moreover, the traditionally solution is based on localized heuristic approaches without considering entire market holistically. The resulting design is sub-optimal.

As discussed herein, to solve the planning process, the disclosed embodiments are utilized to (1) Select a design criteria, either coverage, capacity or a combination of both. For coverage driven, target area with poor coverage and high potential demand to improve customer retention and attract new customers. For capacity driven, maximize the HetNet Capacity to offload macrocells and satisfy demand growth, and minimize cRAN/5G mmWave network cost by considering RF capacity and transport cost simultaneously. (2) Use mathematical programming models to address the cRAN/5G mmWave planning problem. Solve for the optimal solution via mixed integer programming (MIP) based on the design criteria selected in step (1). For the coverage objective (sample objectives include but not limited to): improvement in network performance (such as NPS, KPI); population to be covered. For the capacity objective (sample objectives include but not limited to): saving target over competing capacity options such as macro carrier adds, cell splits, and so on. Constraints (sample constraints include but not limited to): desired coverage performance level; RF quality performance level (server dominance, SINR); cRAN/5G mmWave capacity. (3) Apply an effective sequential algorithm (dynamic programming) approach to solve the optimal cRAN/5G mmWave placement problem. (4) Implement a software tool, HetNet Analysis and Resource Planning (HARP), to enable the cRAN/5G mmWave planning via a user friendly interface with interactive graphical display.

Accordingly, the various embodiments provided herein proposes efficient algorithms to solve cRAN/5G mmWave planning problem optimally. Optimized cRAN/5G mmWave placement solutions minimizing the deployment costs in short and long term. Flexible MIP models can be easily adapted to different scenarios (capacity driven, coverage driven, or a combination of both). The various embodiments provided herein can be seamless integrated with a telecom carrier's existing forecast and planning applications and produce significant automation benefits.

As discussed, provided is a method that uses mixed integer programming and dynamic programming to optimize cRAN/5G mmWave planning in short and long term. Also provided is a method that provides cRAN/5G mmWave budget recommendation based on network performance and capital cost. Further, provided is a method that incorporates various factors that impact cRAN/5G mmWave planning to generate the optimal solution. The factors include (but not limited to) the following: network quality indicator; network traffic load; safe RF condition; terrain clutter type and building 2D/3D view; indoor/outdoor different scenarios; cell split/new carrier cost; transportation cost (backhaul facility, fronthaul facility); cRAN/5G unit expense (equipment cost). Also, a multi-step solution method is employed in the mixed integer programming model to handle coverage and capacity driven scenarios simultaneously. Further, provided is a software implementation to enable cRAN/5G mmWave planning via an interactive user interface.

Further, as implemented, the disclosed embodiments support automated optimal cRAN/5G mmWave planning which can balance mobility capital planning and network performance management. It also provides cRAN/5G mmWave placement and budget guide for planners to follow easily. The implementation allows seamless integration with upstream forecasting applications and downstream tools to keep consistency across fourth generation (4G) and/or 5G forecast and planning networks. The optimal solution provided by the disclosed embodiments and associated implementation will improve the network performance and enhance customer experience with minimized capital cost/investment. Prototyping results show that by deploying around 10K coverage driven cRAN nationwide, demand covered by good RF condition can be improved from around 95% to about 98%. Prototyping results show by deploying around 12K capacity driven cRAN nationwide, can provide investments savings, which can be achieved by avoiding some carrier addition and some cell splitting.

Facilitating heterogeneous network analysis and resource planning in advanced networks can be implemented in connection with any type of device with a connection to the communications network (e.g., a mobile handset, a computer, a handheld device, etc.) any Internet of things (IoT) device (e.g., toaster, coffee maker, blinds, music players, speakers, water meter, etc.), Internet of everything device, and/or any connected vehicles (e.g., cars, airplanes, boats, space rockets, and/or other at least partially automated vehicles (e.g., drones), and so on). In some embodiments, the non-limiting term User Equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles etc. Note that the terms element, elements and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., interchangeably called) "multi-carrier system," "multi-cell operation," "multi-carrier operation," "multi-carrier" transmission and/or reception.

To meet the huge demand for data centric applications, 4G standards can be applied to 5G, also called New Radio (NR) access. The 5G networks can include the following: data rates of several tens of megabits per second supported for tens of thousands of users; 1 gigabit per second can be offered simultaneously (or concurrently) to tens of workers on the same office floor; several hundreds of thousands of simultaneous (or concurrent) connections can be supported for massive sensor deployments; spectral efficiency can be enhanced compared to 4G; improved coverage; enhanced signaling efficiency; and reduced latency compared to Long Term Evolution (LTE).

Multiple Input, Multiple Output (MIMO) systems can significantly increase the data carrying capacity of wireless systems. For these reasons, MIMO is an integral part of the third and fourth generation wireless systems (e.g., Third Generation (3G) and Fourth Generation (4G)). In addition, 5G systems also employ MIMO systems, which are referred to as massive MIMO systems (e.g., hundreds of antennas at the transmitter side (e.g., network) and/receiver side (e.g., user equipment). With a ($N_t$, $N_r$) system, where $N_t$ denotes the number of transmit antennas and Nr denotes the receive antennas, the peak data rate multiplies with a factor of $N_t$ over single antenna systems in rich scattering environment.

In addition, advanced networks, such as a 5G network can be configured to provide more bandwidth than the bandwidth available in other networks (e.g., a 4G network). A 5G network can be configured to provide more ubiquitous connectivity. In addition, more potential of applications and services, such as connected infrastructure, wearable computers, autonomous driving, seamless virtual and augmented reality, "ultra-high-fidelity" virtual reality, and so on, can be provided with 5G networks. Such applications and/or services can consume a large amount of bandwidth. For example, some applications and/or services can consume about fifty times the bandwidth of a high-definition video stream, Internet of Everything (IoE), and others. Further, various applications can have different network performance requirements (e.g., latency requirements and so on).

Cloud Radio Access Networks (cRAN) can enable the implementation of concepts such as SDN and Network Function Virtualization (NFV) in 5G networks. This disclosure can facilitate a generic channel state information framework design for a 5G network. Certain embodiments of this disclosure can include an SDN controller that can control routing of traffic within the network and between the network and traffic destinations. The SDN controller can be merged with the 5G network architecture to enable service deliveries via open Application Programming Interfaces (APIs) and move the network core towards an all Internet Protocol (IP), cloud based, and software driven telecommunications network. The SDN controller can work with, or take the place of, Policy and Charging Rules Function (PCRF) network elements so that policies such as quality of service and traffic management and routing can be synchronized and managed end to end.

Figure 11:
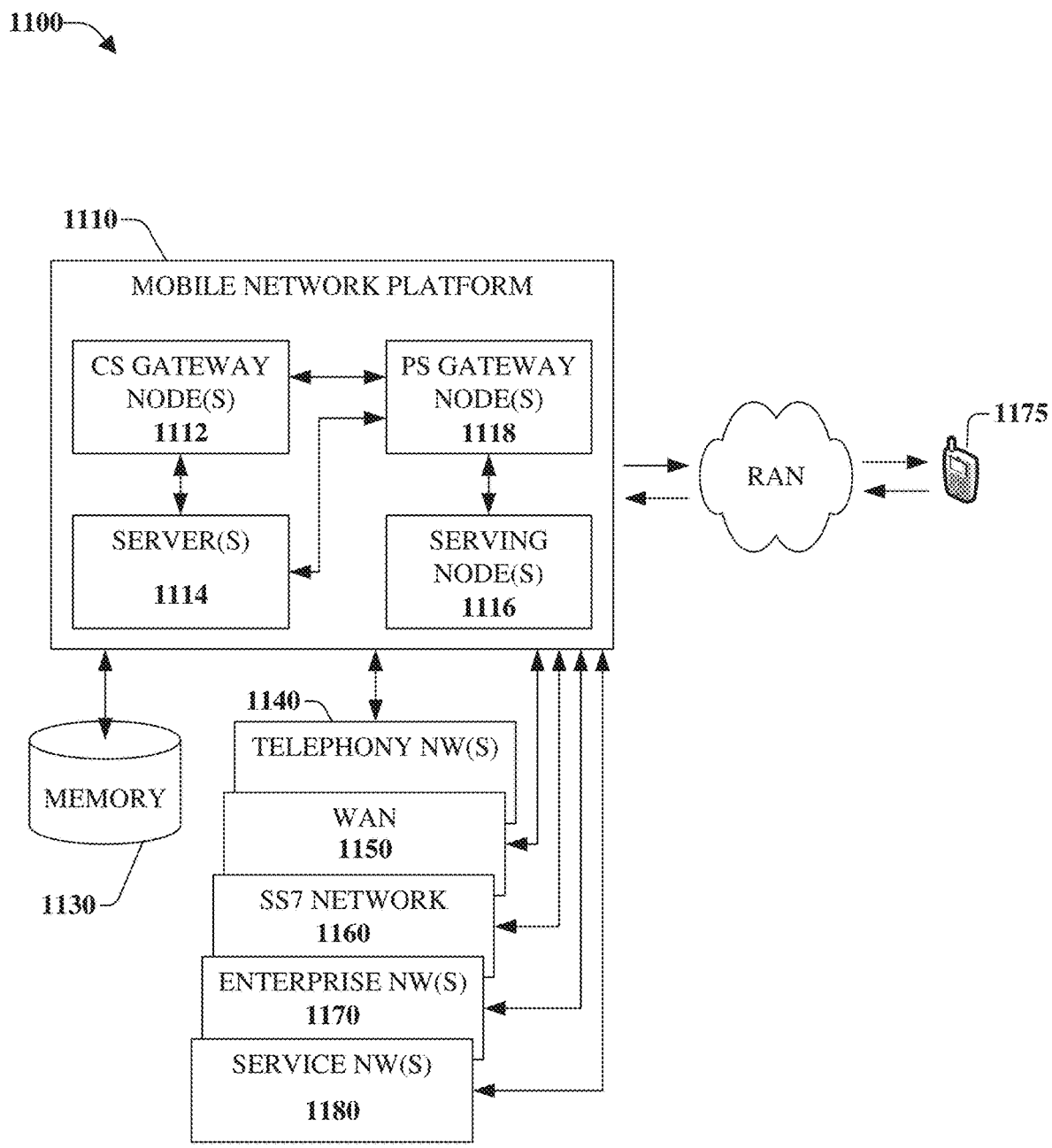
FIG. 11 illustrates an example block diagram of a non-limiting embodiment of a mobile network platform in accordance with one or more embodiments described herein.

FIG. 11 presents an example embodiment 1100 of a mobile network platform 1110 that can implement and exploit one or more aspects of the disclosed subject matter described herein. Generally, wireless network platform 1110 can include components, e.g., nodes, gateways, interfaces, servers, or disparate platforms, that facilitate both packet-switched (PS) (e.g., Internet protocol (IP), frame relay, asynchronous transfer mode (ATM) and circuit-switched (CS) traffic (e.g., voice and data), as well as control generation for networked wireless telecommunication. As a non-limiting example, wireless network platform 1110 can be included in telecommunications carrier networks, and can be considered carrier-side components as discussed elsewhere herein. Mobile network platform 1110 includes CS gateway node(s) 1112 which can interface CS traffic received from legacy networks such as telephony network(s) 1140 (e.g., public switched telephone network (PSTN), or public land mobile network (PLMN)) or a signaling system #7 (SS7) network 1160. Circuit switched gateway node(s) 1112 can authorize and authenticate traffic (e.g., voice) arising from such networks. Additionally, CS gateway node(s) 1112 can access mobility, or roaming, data generated through SS7 network 1160; for instance, mobility data stored in a visited location register (VLR), which can reside in memory 1130. Moreover, CS gateway node(s) 1112 interfaces CS-based traffic and signaling and PS gateway node(s) 1118. As an example, in a 3GPP UMTS network, CS gateway node(s) 1112 can be realized at least in part in gateway GPRS support node(s) (GGSN). It should be appreciated that functionality and specific operation of CS gateway node(s) 1112, PS gateway node(s) 1118, and serving node(s) 1116, is provided and dictated by radio technology(ies) utilized by mobile network platform 1110 for telecommunication. Mobile network platform 1110 can also include the MMEs, HSS/PCRFs, SGWs, and PGWs disclosed herein.

In addition to receiving and processing CS-switched traffic and signaling, PS gateway node(s) 1118 can authorize and authenticate PS-based data sessions with served mobile devices. Data sessions can include traffic, or content(s), exchanged with networks external to the wireless network platform 1110, like wide area network(s) (WANs) 1150, enterprise network(s) 1170, and service network(s) 1180, which can be embodied in local area network(s) (LANs), can also be interfaced with mobile network platform 1110 through PS gateway node(s) 1118. It is to be noted that WANs 1150 and enterprise network(s) 1170 can embody, at least in part, a service network(s) such as IP multimedia subsystem (IMS). Based on radio technology layer(s) available in technology resource(s) 1117, packet-switched gateway node(s) 1118 can generate packet data protocol contexts when a data session is established; other data structures that facilitate routing of packetized data also can be generated. To that end, in an aspect, PS gateway node(s) 1118 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 1100, wireless network platform 1110 also includes serving node(s) 1116 that, based upon available radio technology layer(s) within technology resource(s) 1117, convey the various packetized flows of data streams received through PS gateway node(s) 1118. It is to be noted that for technology resource(s) 1117 that rely primarily on CS communication, server node(s) can deliver traffic without reliance on PS gateway node(s) 1118; for example, server node(s) can embody at least in part a mobile switching center. As an example, in a 3GPP UMTS network, serving node(s) 1116 can be embodied in serving GPRS support node(s) (SGSN).

For radio technologies that exploit packetized communication, server(s) 1114 in wireless network platform 1110 can execute numerous applications that can generate multiple disparate packetized data streams or flows, and manage (e.g., schedule, queue, format, and so on) such flows. Such application(s) can include add-on features to standard services (for example, provisioning, billing, user support, and so forth) provided by wireless network platform 1110. Data streams (e.g., content(s) that are part of a voice call or data session) can be conveyed to PS gateway node(s) 1118 for authorization/authentication and initiation of a data session, and to serving node(s) 1116 for communication thereafter. In addition to application server, server(s) 1114 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 1110 to ensure network's operation and data integrity in addition to authorization and authentication procedures that CS gateway node(s) 1112 and PS gateway node(s) 1118 can enact. Moreover, provisioning server(s) can provision services from external network(s) like networks operated by a disparate service provider; for instance, WAN 1150 or Global Positioning System (GPS) network(s) (not shown). Provisioning server(s) can also provision coverage through networks associated to wireless network platform 1110 (e.g., deployed and operated by the same service provider), such as femto-cell network(s) (not shown) that enhance wireless service coverage within indoor confined spaces and offload RAN resources in order to enhance subscriber service experience within a home or business environment by way of UE 1175.

It is to be noted that server(s) 1114 can include one or more processors configured to confer at least in part the functionality of macro network platform 1110. To that end, the one or more processor can execute code instructions stored in memory 1130, for example. It should be appreciated that server(s) 1114 can include a content manager 1115, which operates in substantially the same manner as described hereinbefore.

In example embodiment 1100, memory 1130 can store information related to operation of wireless network platform 1110. Other operational information can include provisioning information of mobile devices served through wireless network platform 1110, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1130 can also store information from at least one of telephony network(s) 1140, WAN 1150, enterprise network(s) 1170, or SS7 network 1160. In an aspect, memory 1130 can be, for example, accessed as part of a data store component or as a remotely connected memory store.

Figure 12:
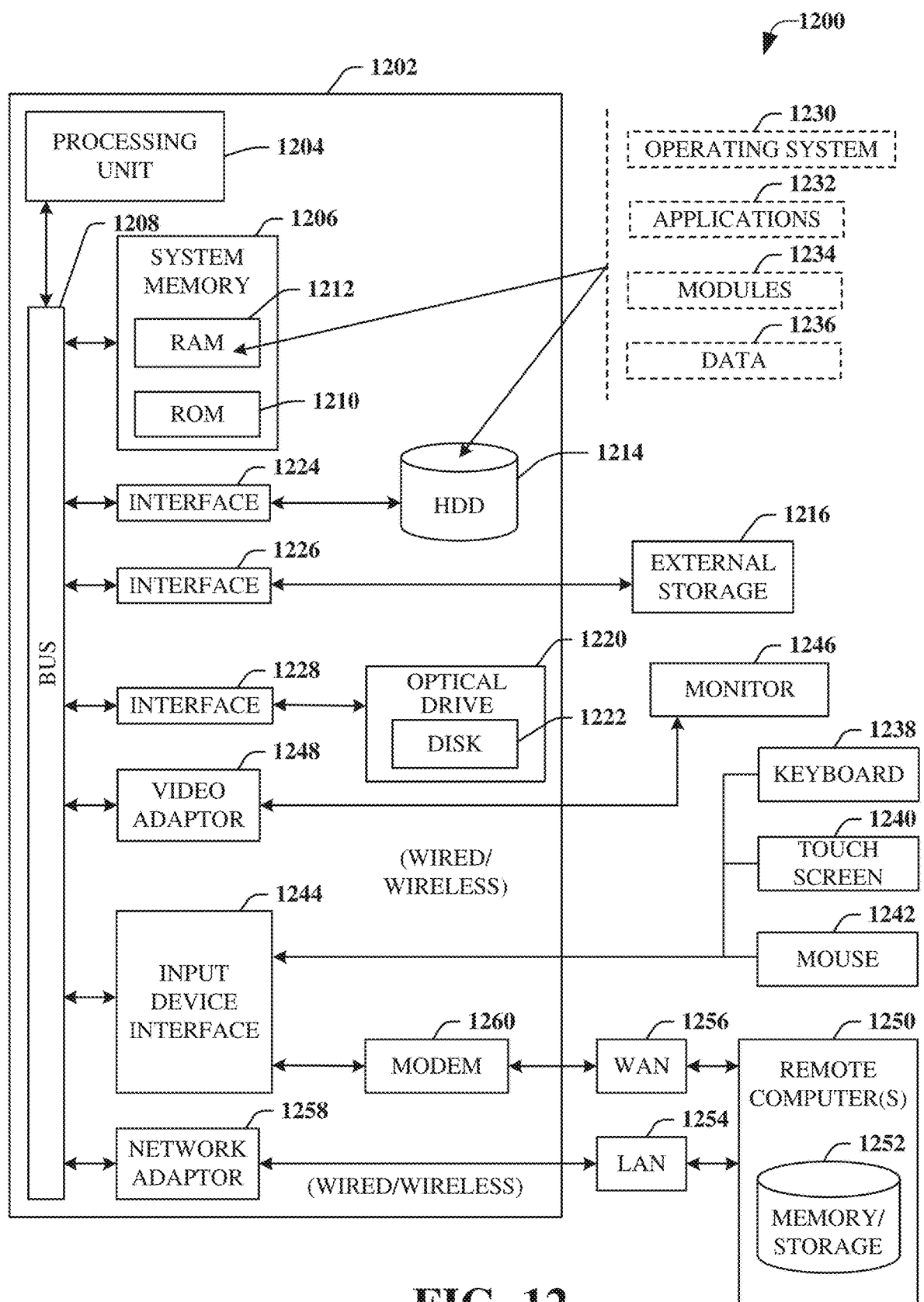
FIG. 12 illustrates an example block diagram of an example computer operable to engage in a system architecture that facilitates wireless communications in accordance with one or more embodiments described herein.

In order to provide additional context for various embodiments described herein, FIG. 12 and the following discussion are intended to provide a brief, general description of an example, non-limiting, computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example computing environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in computing environment 1200, a solid-state drive (SSD) could be used in addition to, or in place of, an internal HDD 1214. The internal HDD 1214, external storage device(s) 1216 and optical disk drive 1220 can be connected to the system bus 1208 by an HDD interface 1224, an external storage interface 1226 and an optical drive interface 1228, respectively. The HDD interface 1224 for external drive implementations can include at least one or both of Universal Serial Bus (USB) and Institute of Electrical and Electronics Engineers (IEEE) 1094 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally include emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can include one virtual machine (VM) of multiple VMs hosted at computer 1202. Furthermore, operating system 1230 can provide runtime environments, such as the Java runtime environment or the .NET framework, for application programs 1232. Runtime environments are consistent execution environments that allow application programs 1232 to run on any operating system that includes the runtime environment. Similarly, operating system 1230 can support containers, and application programs 1232 can be in the form of containers, which are lightweight, standalone, executable packages of software that include, e.g., code, runtime, system tools, system libraries and settings for an application.

Further, computer 1202 can be enable with a security module, such as a trusted processing module (TPM). For instance, with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1260, and a pointing device, such as a mouse 1262. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1264 that can be coupled to the system bus 1208, but can be connected by other interfaces, such as a parallel port, an IEEE 1094 serial port, a game port, a USB port, an IR interface, a BLUETOOTH® interface, etc.

A monitor 1266 or other type of display device can be also connected to the system bus 1208 via an interface, such as a video adapter 1268. In addition to the monitor 1266, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN 1254) and/or larger networks, e.g., a wide area network (WAN 1256). Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the LAN 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1280 or can be connected to a communications server on the WAN 1256 via other means for establishing communications over the WAN 1256, such as by way of the Internet. The modem 1280, which can be internal or external and a wired or wireless device, can be connected to the system bus 1208 via the input device interface 1264. In a networked environment, program modules depicted relative to the computer 1202 or portions thereof, can be stored in the memory/storage device 1252, which can be a remote memory/storage device. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1280, respectively. Upon connecting the computer 1202 to an associated cloud storage system, the external storage interface 1226 can, with the aid of the adapter 1258 and/or modem 1280, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments. The term "include" can be used interchangeably with the term "comprise," or variants thereof.

As used in this disclosure, in some embodiments, the terms "component," "system," "interface," and the like are intended to refer to, or include, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can include a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, Wireless Fidelity (Wi-Fi), Global System For Mobile Communications (GSM), Universal Mobile Telecommunications System (UMTS), Worldwide Interoperability For Microwave Access (WiMAX), enhanced General Packet Radio Service (enhanced GPRS), Third Generation Partnership Project (3GPP) long term evolution (LTE), Third Generation Partnership Project 2 (3GPP2) Ultra Mobile Broadband (UMB), high speed packet access (HSPA), Z-Wave, Zigbee and other 802.XX wireless technologies and/or legacy telecommunication technologies.

The various aspects described herein can relate to New Radio (NR), which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, "5G" can also be referred to as NR access. Accordingly, systems, methods, and/or machine-readable storage media for facilitating link adaptation of downlink control channel for 5G systems are desired. As used herein, one or more aspects of a 5G network can include, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification procedures and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   determining, by a system comprising a memory and a processor, candidate locations for placement of a resource within a defined grid area associated with a communication network based on a determination that a demand for services within the defined grid area exceeds a coverage capability of the defined grid area, wherein the resource is selected from a group of resources consisting of a cloud radio access network node and a fifth generation millimeter wave node that communicates according to a fifth generation millimeter wave protocol, and
   wherein the determining comprises:
   determining a load weighted coverage score of the defined grid area based on the placement of the resource, and
   selecting the placement of the resource based on the load weighted coverage score satisfying a predefined threshold; and
   facilitating, by the system, the placement of the resource within the defined grid area, wherein the placement of the resource is determined to satisfy the demand for services and is based on the candidate locations.

2. The method of claim 1, wherein determining comprises:
   receiving, by the system, one or more conditions identified for the defined grid area; and
   transforming, by the system, the one or more conditions into input data for a mixed integer programming model, wherein the input data comprises at least one constraint of the mixed integer programming model and at least one objective of the mixed integer programming model.

3. The method of claim 1, wherein the resource is the cloud radio access network node, and wherein the facilitating comprises retaining a traffic load weighted coverage score of the defined grid area below a threshold load weighted coverage score level.

4. The method of claim 1, wherein the resource is the fifth generation millimeter wave node, and wherein the facilitating comprises retaining a fifth generation traffic load weighted coverage score of the defined grid area below a threshold load weighted coverage score level.

5. The method of claim 1, wherein the resource is the cloud radio access network node, and wherein the load weighted coverage score is selected to retain a quantity of cloud radio access network nodes located in the defined grid area below a defined quantity.

6. The method of claim 1, wherein the resource is the fifth generation millimeter wave node, and wherein the load weighted coverage score is selected to restrict a quantity of fifth generation millimeter wave nodes in the defined grid area below a defined quantity.

7. The method of claim 1, wherein determining comprises:
   using, by the system, a mixed integer programming model built to solve resource placement issues in a communications network, wherein the mixed integer programming model considers short term planning and long term planning for the defined grid area.

8. The method of claim 1, further comprising:
   rendering, by the system, an indication of the candidate locations for the placement of the resource within the defined grid area on a display area of a user equipment.

9. The method of claim 1, further comprising:
prior to the determining, determining, by the system, that a number of dropped communications within the defined grid area exceeds a defined dropped communication level.

10. A method, comprising:
determining, by a system comprising a memory and a processor, candidate locations for positioning a resource within a grid area associated with a communications network based on a determination that demand for services exceeds a current capability of the communications network within the grid area, wherein the resource is one of a cloud radio access network node and a fifth generation millimeter wave node that communicate according to a fifth generation millimeter wave protocol, wherein the determining comprises:
  selecting the positioning of the resource based on a load weighted coverage score of the grid area satisfying a predefined threshold, wherein the load weighted coverage score is determined based on the positioning of the resource; and
facilitating, by the system, the positioning of the resource within the grid area based on the candidate locations, wherein the positioning of the resource comprises offloading network traffic from an existing resource to the resource.

11. The method of claim 10, wherein the communications network is a heterogeneous network, and wherein the existing resource is a macrocell, and wherein the offloading of the network traffic comprises offloading the network traffic from the macrocell to the cloud radio access network node associated with the communications network.

12. The method of claim 11, wherein the offloading comprises avoiding a carrier split within the communications network.

13. The method of claim 11, wherein the offloading comprises maintaining a number of carriers for the communications network.

14. The method of claim 10, wherein the communications network is a heterogeneous network, wherein the existing resource is a macrocell, wherein the demand for services is classified as fifth generation services, and wherein the offloading of the network traffic comprises offloading the network traffic from the macrocell to the fifth generation millimeter wave node.

15. The method of claim 10, further comprising, prior to the facilitating, evaluating, by the system, a value associated with the positioning, wherein the facilitating is performed based on the value satisfying a function with respect to a defined value.

16. A system, comprising:
a processor; and
a memory that stores executable instructions that, when executed by the processor, facilitate performance of operations, comprising:
determining that a resource is to be added to existing resources at a grid level of a network, wherein the resource is selected from a group of resources consisting of a cloud radio access network node and a fifth generation millimeter wave node; and
selecting candidate locations for placement of the resource based on a coverage-driven objective and a capacity-driven objective defined for the network, wherein the coverage-driven objective is associated with a demand for services within the grid level of the network, and
wherein the capacity-driven objective is associated with demand growth within the grid level of the network, and
wherein the selecting the candidate locations comprises selecting the candidate locations based on a load weighted coverage score of the grid level of the network being determined to satisfy a predefined threshold, and
wherein the load weighted coverage score is determined based on the candidate locations.

17. The system of claim 16, wherein the selecting comprises:
determining a solution to the coverage-driven objective and the capacity-driven objective using a mixed integer programming model and based on a design configuration defined for the network, wherein the network is a heterogeneous network; and
applying a programming approach to determine the placement of the resource.

18. The system of claim 16, wherein the fifth generation millimeter wave node communicates according to a fifth generation millimeter wave protocol.

19. The system of claim 16, wherein the load weighted coverage score is selected to restrict a quantity of fifth generation millimeter wave nodes in the grid level of the network below a defined quantity.

20. The system of claim 16, wherein the load weighted coverage score is selected to retain a quantity of cloud radio access network nodes located in the grid level of the network below a defined quantity.

* * * * *